United States Patent [19]
Nonomura et al.

[11] Patent Number: 5,635,642
[45] Date of Patent: Jun. 3, 1997

[54] VIBRATION-SENSING DEVICE METHOD OF ADJUSTING THE SAME AND ANGULAR VELOCITY SENSOR TAKING ADVANTAGE OF THE SAME

[75] Inventors: Yutaka Nonomura, Nagoya; Takeshi Morikawa, Seto; Masayuki Okuwa, Nagoya; Kouji Tsukada, Seto, all of Japan

[73] Assignee: Kabushiki Kaisha Toyota Chuo Kenkyusho, Aichi-ken, Japan

[21] Appl. No.: 518,840

[22] Filed: Aug. 24, 1995

[30] Foreign Application Priority Data

Aug. 25, 1994 [JP] Japan .................... 6-225635

[51] Int. Cl.$^6$ ........................................ G01P 3/44
[52] U.S. Cl. ........................................ 73/504.16
[58] Field of Search .................. 73/504.02, 504.12, 73/504.16, 504.04, 504.15; 310/321, 329, 333, 370

[56] References Cited

U.S. PATENT DOCUMENTS

| | | | |
|---|---|---|---|
| 3,488,530 | 1/1970 | Staudte | 310/321 |
| 4,538,461 | 9/1985 | Juptner et al. | 73/504.16 |
| 4,628,734 | 12/1986 | Watson | 73/504.16 |
| 4,694,696 | 9/1987 | Hojo et al. | 73/504.16 |
| 4,930,351 | 6/1990 | Macy et al. | 73/504.04 |
| 5,056,366 | 10/1991 | Fersht et al. | 73/504.15 |
| 5,285,686 | 2/1994 | Peters | 73/504.15 |

FOREIGN PATENT DOCUMENTS 7-113645  5/1995  Japan .

*Primary Examiner*—Hezron E. Williams
*Assistant Examiner*—Richard A. Moller
*Attorney, Agent, or Firm*—Oblon, Spivak, McClelland, Maier & Neustadt, P.C.

[57] ABSTRACT

A vibration-sensing device (10) with high sensitivity includes a torsion bar (16) fixed on both ends thereof to a frame, a tuning fork-shaped vibrating member (12) joined with and supported by the torsion bar (16), and first and second torsion vibrating bodies (14,15) symmetrically projected from the torsion bar (16). The torsion bar (16), the tuning fork-shaped vibrating member (12), and the torsion vibrating bodies (14,15) constitute a torsion vibrating system. The application of an angular velocity to the vibration-sensing device (10) under the condition of plane vibrations of first and second vibrating tines (12a, 12b) of the first tuning fork-shaped vibrating member (12) along an X axis generates Coriolis forces to drive torsion vibration of the first tuning fork-shaped vibrating member (12) round the torsion bar (16), thereby driving torsion vibration corresponding to the angular velocity in the torsion vibrating system. The torsion vibration is amplified by the first and second torsion vibrating bodies (14,15) and detected by torsion vibration-detecting piezoelectric elements (20a,20b) attached to the torsion vibrating bodies (14,15). An angular velocity sensor using the vibration-sensing device, and a method of adjusting the sensitivity of the device are also provided.

32 Claims, 19 Drawing Sheets

DISTANCE L2 BETWEEN VIBRATING MEMBER
AND TORSION VIBRATING BODIES

VIBRATION-SENSING DEVICE METHOD OF ADJUSTING THE SAME AND ANGULAR VELOCITY SENSOR TAKING ADVANTAGE OF THE SAME

BACKGROUND OF THE INVENTION

1. Field of the Invention

The present invention relates to a vibration-sensing device, which includes a support member fixed to an outside fixation member, and vibrating tines or a vibrating member of a tuning fork shape vibrating along a predetermined direction in a plane and supported by the support member. The invention also pertains to a method of adjusting such a vibration-sensing device, as well as to an angular velocity sensor for detecting an angular velocity by taking advantage of such a vibration-sensing device.

2. Description of the Related Art

When a rotating force is applied to a vibrating member vibrating along a predetermined direction, for example, along an X axis in the plane which contains rectangular coordinate axes (X-Z plane) and the vibrating member rotates round an Y axis perpendicular to the X-Z plane, the angular velocity of rotation causes the vibrating member to receive a Coriolis force in the direction of Z axis. The Coriolis force depending upon the angular velocity is measured indirectly as a deflection displacement of the vibrating member or as a stress on the vibrating member or directly by means of the piezoelectric effect of piezoelectric elements, and the angular velocity of the vibrating member is then calculated from the Coriolis force. A vibration-sensing device having such a vibrating member vibrating along the X axis is applied to the angular velocity sensor, which is mounted on a vehicle or another object to detect the yaw rate observed by turning the vehicle. The angular velocity sensor is also mounted on the body or arm of an industrial robot to detect the yaw rate observed on the body or arm accompanied by a shift of the robot and control the orientation of the robot. For example, a vibrating angular velocity sensor with a vibration-sensing device having a tuning fork-shaped vibrating member has been proposed in the U.S. Pat. No. 4,538,461.

The vibration-sensing device applied to the vibrating angular velocity sensor disclosed in the U.S. Pat. No. 4,538,461 has a tuning fork-shaped crystal vibrating member, where a pair of vibrating tines are joined with each other on one end to form a tuning fork. The tuning fork-shaped crystal vibrating member (hereinafter referred to as the first tuning fork-shaped vibrating member) is connected with a pivot at the joint of the two vibrating tines. Both ends of the pivot are fixed to a frame by means of support beams arranged perpendicular to the pivot. The pivot is provided with a dummy reaction mass element in response to torsion vibration of the first tuning fork-shaped vibrating member, whereas a vibration adjusting mass element is attached to one end of each vibrating tine of the first tuning fork-shaped vibrating member.

Vibration-driving electrodes for driving vibrations of the vibrating tines along the X axis are mounted on the respective vibrating tines of the first tuning fork-shaped vibrating member, whereas detecting-electrodes for detecting torsion vibrations are mounted on the pivot. The vibrating angular velocity sensor thus constructed detects the angular velocity in the following manner. Alternating voltages are continuously applied to the vibration-driving electrodes to give the vibrating tines with the driving electrodes mounted thereon plane vibrations along the X axis. When an angular velocity acts on the sensor while the vibrating tines are under the condition of plane vibration, the angular velocity causes torsion vibration in the sensor, which is detected as a voltage output from the detecting electrode.

When an angular velocity is constantly applied to the sensor while the vibrating tines of the first tuning fork-shaped vibrating member are under the condition of plane vibration, the mass balance of plane vibration and torsion vibration of the two vibrating tines of the first tuning fork-shaped vibrating member is of great importance for the stable torsion vibration of the sensor, as is known well. In the vibration-sensing device disclosed in the U.S. Pat. No. 4,538,461, the mass balance of vibrations is attained by appropriately designing the shape of the vibration adjusting mass element attached to the end of each vibrating tine or controlling the mass of the vibration adjusting mass element.

Problems as described below, however, arise in the vibrating angular velocity sensor proposed by the U.S. Pat. No. 4,538,461.

In such a vibrating angular velocity sensor, it is essential to improve the detection sensitivity of the angular velocity, as well as to stabilize the torsion vibration driven on the sensor. As is already known, for the improved detection sensitivity of the angular velocity, in addition to the mass balance of vibrations of the vibrating tines, it is required to set a predetermined relationship between the resonance frequency of plane vibration driven in the direction of X axis and the resonance frequency of detected vibration. For example, both the resonance frequencies are made substantially identical with each other. In the sensor disclosed in the U.S. Pat. No. 4,538,461 for detecting the torsion vibration, it is required to adjust the resonance frequency of plane vibration along the X axis and the resonance frequency of torsion vibration along the Z axis driven by the application of angular velocity so that the resonance frequencies might become substantially identical with each other. It is known that the detection sensitivity of the sensor, as well as the temperature characteristics, the S/N ratio, and the stability, depends upon the degree of adjustment. However, the following difficulties arise in the adjustment of frequency.

Mass control on the ends of vibrating tines is known to be effective for the adjustment of frequency of the first tuning fork-shaped vibrating member. Since the end of each vibrating tine is under a large vibration displacement, the mass control on the ends of vibrating tines results in a significant variation in resonance frequency of the first tuning fork-shaped vibrating member. The mass control on the ends of vibrating tines for adjusting the resonance frequency of plane vibration of the vibrating tines of the first tuning fork-shaped vibrating member to a target resonance frequency, that is, the resonance frequency of torsion vibration, leads to an undesirable variation in resonance frequency of torsion vibration. The variation in resonance frequency of torsion vibration is ascribed to the properties on the ends of vibrating tines of the first tuning fork-shaped vibrating member, which have a large vibration displacement in driven plane vibration as well as a large vibration displacement in torsion vibration of the vibrating tines.

As described above, the mass control on the ends of vibrating tines varies both the resonance frequencies of plane vibration and torsion vibration generated by the application of angular velocity. The degree of variation for plane vibration is not identical with that for torsion vibration. It is accordingly difficult to independently adjust the resonance frequency of driven plane vibration and the resonance frequency of torsion vibration by the mass control on the ends of vibrating tines. A complicated adjustment process, for example, monitoring variations in both the resonance frequencies while one of the resonance frequencies is adjusted through the mass control, is thus required to set the difference between both the resonance frequencies within a predetermined range. Such adjustment process including the mass control and the monitor of both the resonance frequencies requires the skill of workers and consumes much labor and time. The process also has difficulties in adjusting the resonance frequencies to desired values with high precision. This prevents sensors of high sensitivity from being manufactured at high yield. These problems are not characteristic of crystal but are observed in other materials including various metals like stainless steel, iron-nickel alloys, and identity elastic alloys, and dielectrics like piezoelectric elements (PZT).

A vibrating angular velocity sensor shown in FIG. 12 of JAPANESE PATENT LAID-OPEN GAZETTE No. H7-113645 has an element of certain form similar to the dummy reaction mass element shown in the U.S. Pat. No. 4,538,461. In the sensor of JAPANESE PATENT LAID-OPEN GAZETTE No. H7-113645, however, the element (represented by the numeral '83' in FIG. 12) having a shape similar to the dummy reaction mass element is provided with wirings to electrodes of vibrating tines and fixed to an outside member. Although having a similar shape, the element 83 does not function as the dummy reaction mass element in the U.S. Pat. No. 4,538,461.

Other problems as described below also arise in the vibrating angular velocity sensor proposed by the U.S. Pat. No. 4,538,461.

The detecting electrodes for detecting torsion vibration generated by the application of angular velocity are formed on the side faces of the pivot used for supporting the first tuning fork-shaped vibrating member and divided vertically along the Z axis. In the sensor having such detecting electrodes, when an angular velocity acts on the sensor to generate Coriolis forces, the pivot with the detecting electrodes receives a torsional force in the direction of X axis. The detecting electrodes detect a stress applied onto the crystal due to the torsional force. The stress detected is a shearing stress τyz of the pivot and has a term depending upon the piezoelectric constant of crystal given by the matrix expressed as:

$$e_{ij}[C/m^2] = \begin{array}{c} x \\ y \\ z \end{array} \begin{bmatrix} x & y & z & yz & zx & xy \\ 0.171 & -0.171 & 0 & -0.0403 & 0 & 0 \\ 0 & 0 & 0 & 0 & 0.0403 & -0.171 \\ 0 & 0 & 0 & 0 & 0 & 0 \end{bmatrix} \quad \text{[Equation 1]}$$

In the crystal vibrating angular velocity sensor of the U.S. Pat. No. 4,538,461, the piezoelectric constant corresponding to the shearing stress τyz generated by the torsional force on the pivot in the electric field of Y or Z direction is defined by the entry in the second row and the fourth column (e24) or in the third row and the fourth column (e34) in the matrix of Equation 1. Both the entries are, however, equal to zero, and the piezoelectric constant-depending term in the torsional force-based shearing stress detected by the detecting electrodes of the sensor becomes inevitably equal to zero. This angular velocity sensor accordingly can not detect the torsional force-based shearing stress τyz precisely, thereby having difficulty in improving the detection sensitivity.

SUMMARY OF THE INVENTION

The object of the invention is thus to improve sensitivity of a vibration-sensing device and an angular velocity sensor using the vibration-sensing device and simplify a method of adjusting the sensitivity.

The above and other related objects are realized by a vibration-sensing device comprising:

a first tuning fork-shaped vibrating member having a base, a first vibrating tine and a second vibrating tine, said first and second vibrating tines being joined with each other at the base to form a tuning fork-like shape, the first and second vibrating tines vibrating in a plane where the first and second vibrating tines exist;

a support member, joined with the base of the first tuning fork-shaped vibrating member, for supporting the first tuning fork-shaped vibrating member;

an outside fixation member for supporting the support member; and a torsion vibrating member comprising a first beam projected from the support member and a first mass control element fixed to the first beam to be arranged apart from the support member, the support member, the first tuning fork-shaped vibrating member, and the torsion vibrating member constituting a torsion vibrating system round an axis of the support member, and the torsion vibrating system causing torsion vibration to the torsion vibrating member.

In the vibration-sensing device of this structure, the first tuning fork-shaped vibrating member having the base and the first and second vibrating tines to form a tuning fork-like shape is supported by the support member, which is fixed to the outside fixation member. The first tuning fork-shaped vibrating member has vibration (plane vibration) along a predetermined first direction (direction of X axis by way of example) in a plane where the first and second vibrating tines exist. Application of an angular velocity round a predetermined second direction perpendicular to the direction of X axis (direction of Y axis by way of example) to the first tuning fork-shaped vibrating member generates Coriolis forces and causes vibration of the first tuning fork-shaped vibrating member in a direction of Z axis. The base of the first tuning fork-shaped vibrating member is joined with and supported by the support member, and the support member and the first tuning fork-shaped vibrating member constitute a torsion vibrating system round the support member. The vibration of the first tuning fork-shaped vibrating member in the direction of Z axis thus drives torsion vibration of the first tuning fork-shaped vibrating member round the Y axis and thereby torsion vibration of the torsion vibrating system round the Y axis. Since the first and second vibrating tines of the first tuning fork-shaped vibrating member joined with and supported by the support member are arranged across the support member, the torsion vibration having a relatively large amplitude is driven round the support member.

The torsion vibrating member is projected from the support member supporting the first tuning fork-shaped vibrating member, and constitutes the torsion vibrating system with the support member and the first tuning fork-shaped vibrating member. The torsion vibrating member has torsion vibration accompanied with the torsion vibration driven in the torsion vibrating system, and amplifies the torsion vibration in the torsion vibrating system. Since the torsion vibrating member is projected from the support member independently of the first tuning fork-shaped vibrating member, the torsion vibration of the torsion vibrating member balances the torsion vibration of the first tuning fork-shaped vibrating member and is thus reverse to the torsion vibration of the first tuning fork-shaped vibrating member.

An angular velocity acts on the first tuning fork-shaped vibrating member vibrating in the direction of X axis to generate Coriolis forces, which cause the first tuning fork-shaped vibrating member to vibrate in the direction of Z axis and subsequently drive torsion vibration round the Y axis driven in the torsion vibrating system. The vibration of the first tuning fork-shaped vibrating member in the direction of Z axis depends upon the Coriolis force, and the torsion vibration of the torsion vibrating member accordingly depends upon the Coriolis force. While the first tuning fork-shaped vibrating member has plane vibration along the X axis and receives an angular velocity to generate Coriolis forces, the torsion vibrating member separate from the first tuning fork-shaped vibrating member has torsion vibration depending upon the Coriolis force. The first tuning fork-shaped vibrating member supported by the support member is used only for driving vibrations in the direction of X axis, whereas the torsion vibrating member is applied only for detecting the torsion vibration depending upon the Coriolis force. The vibration-sensing device of the invention can drive vibration of the first tuning fork-shaped vibrating member at its root causing a large deflection, and detect torsion vibration at the root of the torsion vibrating member having a large deflection.

In the vibration-sensing device of the invention, the first tuning fork-shaped vibrating member comprises the first vibrating tine and the second vibrating tine to form a tuning fork, and has plane vibration in the direction of X axis to generate Coriolis forces. The first vibrating tine has plane vibration in +X direction, while the second vibrating tine has plane vibration in −X direction. When an angular velocity round the Y axis acts on the first tuning fork-shaped vibrating member, the first vibrating tine generates a Coriolis force proportional to the angular velocity in +Z direction and the second vibrating tine in −Z direction. Since the base of the tuning fork-shaped vibrating tine is joined with and supported by the support member, the Coriolis force of the first vibrating tine in +Z direction and the Coriolis force of the second vibrating tine in −Z direction are symmetrical with respect to the support member.

The first vibrating tine and the second vibrating tine arranged symmetrically with respect to the support member are displaced in opposite directions at identical timings. Torsion vibration round the Y axis is accordingly driven on the joint with the support member. The amplitude of torsion vibration is amplified by the torsion vibrating system including the torsion vibrating member. Torsion vibrations of the support member and the torsion vibrating member depending upon the angular velocity thus have a large amplitude.

In the vibration-sensing device of this structure, torsion vibration of the torsion vibrating member is amplified by the mass control element of the torsion vibrating member, which is disposed apart from the support member via the beam. Even when the torsion vibration driven in the torsion vibrating system by the first tuning fork-shaped vibrating member has a small amplitude, the mass control element works to increase the amplitude and enhance the output level of detection signals of such torsion vibration. The vibration-sensing device of the invention increases the amplitude of torsion vibration and the output level, thereby improving the detection sensitivity of Coriolis force and angular velocity.

In this vibration-sensing device, torsion vibration of the torsion vibrating member is reverse to torsion vibration of the first tuning fork-shaped vibrating member, so that the moment of inertia round the support member arising from these torsion vibrations in opposite directions is well balanced. This effectively prevents the energy of torsion vibration of the support member from leaking into the outside fixation member which the support member is fixed to.

Leaking the energy of torsion vibration of the support member into the fixation member undesirably vibrates the fixation member and leads to various troubles like disturbed vibration characteristics of the support member, the first tuning fork-shaped vibrating member having plane vibration, and the torsion vibrating member. The condition of leakage of vibration into the fixation member varies with a variation in rigidity of the support member due to the varying environmental temperature. The varying condition results in unstable characteristics of the support member, the first tuning fork-shaped vibrating member, and the torsion vibrating member. The vibration-sensing device of the invention, however, effectively prevents such troubles.

The beam of the torsion vibrating member is projected from the support member independently of the first tuning fork-shaped vibrating member having plane vibration. Torsion vibration generated in the torsion vibrating member can be amplified by changing the projected length or other conditions or by changing the mass or dimensions of the mass control element fixed to the beam.

The beam of the torsion vibrating member is projected from the support member in any direction that allows the torsion vibrating member to be added to the torsion vibrating system consisting of the support member and the first tuning fork-shaped vibrating member and to have torsion vibration. The beam of the torsion vibrating member can thus be projected from the support member in the plane where the support member and the first tuning fork-shaped vibrating member exist. Alternatively, the beam of the torsion vibrating member may be projected from the support member to be perpendicular to the plane where the support member and the first tuning fork-shaped vibrating member exist.

In the vibration-sensing device of the invention, the first tuning fork-shaped vibrating member, the support member, and the torsion vibrating member may be composed of any material which stably maintains and propagates vibrations. Examples of applicable material comprise various metals and alloys like single metals, stainless steel, iron-nickel alloys, and identity elastic alloys, dielectrics like crystal and piezoelectric elements (PZT), semiconductors like silicon, powdery sintered bodies, crystals, glass, and ceramics.

According to one preferable application, the torsion vibrating member comprises a first beam projected from the support member, a first mass control element attached to the first beam, a second beam projected from the support member, and a second mass control element attached to the second beam. The first beam with the first mass control element and the second beam with the second mass control element are symmetrical with respect to the support member.

In the vibration-sensing device of this structure, in response to the torsion vibration of the torsion vibrating member, the first mass control element and the second mass control element have torsion vibrations in opposite directions round the support member. This structure remarkably amplifies torsion vibration of the torsion vibrating member and further improves the detection sensitivity.

In one preferable structure, the first and second beams of the torsion vibrating member and the support member are bars of rectangular cross section. Such simple cross sectional shape simplifies the manufacturing process.

It is further preferable that at least one of the first and second beams of the torsion vibrating member and the support member is a torsion spring-like structure which easily drives torsion vibration; for example, curved, spiral, or looped structure. This structure allows smaller spring constants of the beam and the support member and shortens the whole length of the support member and the length of the beam of the torsion vibrating member, thereby reducing the dimensions of the vibration-sensing device and the angular velocity sensor using such vibration-sensing device.

According to one preferable application, the support member and the first beam, the second beam, the first mass control element, and the second mass control element of the torsion vibrating member exist in the plane where the first vibrating tine and the second vibrating tine exist.

The vibration-sensing device of this structure is easily manufactured by cutting, etching, or working a plate member of any material described above.

The first mass and the second mass control elements may be plate-like bodies respectively disposed on tips of the first and second beams. The plate-like bodies simplify the process of increasing or decreasing the mass of the mass control elements.

The torsion vibrating member, the support member, and the first tuning fork-shaped vibrating member are, for example, composed of crystal, and a longitudinal direction of the support member coincides with a direction of Y axis of the crystal. Properties of crystal efficiently and stably drive plane vibration of the first and second vibrating tines of the first tuning fork-shaped vibrating member as well as torsion vibration of the torsion vibrating member of the torsion vibrating system. Since the longitudinal direction of the support member coincides with the Y axis of crystal, the piezoelectric constant used for detecting a shearing stress, which is generated on the support member due to the torsion vibration, as an electric signal by the piezoelectric effect of crystal is the entry in the first row and the second column in the matrix of Equation 1. The piezoelectric constant in the first row and the second column is not equal to zero, and accordingly allows the shearing force on the support member to be detected precisely as an electric signal representing the magnitude of shearing stress, thereby further improving the detection sensitivity.

In one preferable structure, the support member further comprises:

a bar element joined with the base of the first tuning fork-shaped vibrating member; and a frame having a pair of first frame bars and a pair of second frame bars, the pair of first frame bars being substantially parallel to the bar element, the first and second frame bars forming the frame of a rectangular shape, the frame being fixed both ends of the bar element, the frame surrounding the first tuning fork-shaped vibrating member and the torsion vibrating member in the plane, the frame being fixed to the outside fixation member on respective centers of the pair of first frame bars.

The vibration-sensing device is fixed to the outside fixation member by securing the frame of the support member on the respective centers of the pair of first frame bars. The respective centers of the pair of first frame bars are neutral points of vibrations or torsions, that is, sites where no vibration displacement is observed even when vibrations or torsions arise on the pair of first frame bars of the frame. The first tuning fork-shaped vibrating member, the torsion vibrating member, and the frame itself are accordingly fixed and secured to the outside fixation member at the sites of no vibration displacement. This structure effectively prevents vibrations of the first tuning fork-shaped vibrating member and the torsion vibrating member from leaking into the outside fixation member, thereby improving the Q value and the sensitivity of the vibration-sensing device. The structure also interferes with propagation of external disturbance-based vibrations through the frame and effectively protects the vibration-sensing device from adverse effects, like lowered precision, due to the disturbance-based vibrations.

The frame functioning to relieve the stress interferes with propagation of a stress, caused by the difference between coefficients of thermal expansion of the outside fixation member and the first tuning fork-shaped vibrating member and the other constituents of the vibration-sensing device, to the vibration-sensing device. This structure effectively prevents a variation in frequency of the vibration-sensing device by the thermal stress, and stably maintains vibrations of the vibration-sensing device over a wide temperature range, thereby preventing the temperature variation from lowering the precision of detection.

The frame for supporting the first tuning fork-shaped vibrating member and the other constituents of the vibration-sensing device protects the vibration-sensing device from damages. The fixation also realizes easy handling and enhances the yield of manufacturing vibration-sensing devices.

In another preferable structure, the support member comprises a bar element joined with the base of the first tuning fork-shaped vibrating member, where one end of the bar element is fixed to the outside fixation member.

This vibration-sensing device has simpler structure and less number of fixation points to the outside fixation member, thus reducing the time and cost required for the manufacture.

According to one preferable application, the torsion vibrating member is projected from the support member to face free ends of the first and second vibrating tines of the first tuning fork-shaped vibrating member.

This modification increases the length between the joint of the support member with the first tuning fork-shaped vibrating member and the joint with the torsion vibrating member, thereby lowering the frequency of torsion vibration. The frequency of plane vibration of the first tuning fork-shaped vibrating member falls with the decrease in frequency of torsion vibration. This gives a vibration-sensing device vibrating at lower frequencies.

According to another preferable application, the vibration-sensing device is further provided with a second tuning fork-shaped vibrating member having identical structure to that of the first tuning fork-shaped vibrating member, where the second tuning fork-shaped vibrating member is joined with the support member in such an arrangement that the first tuning fork-shaped vibrating member and the second tuning fork-shaped vibrating member are symmetrical with respect to the torsion vibrating member.

The two tuning fork-shaped vibrating members in the torsion vibrating system heightens the vibrational energy of plane vibration and enhances the magnitude of torsion vibration corresponding to the angular velocity, thus improving the sensitivity of the sensor.

According to another preferable application, the torsion vibrating member is adaptable to have an initial moment of inertia round the axis of the support member 1 through 0.1 times a natural moment of inertia of the first tuning fork-shaped vibrating member round the axis of the support member. So that, the resonance frequency of torsion vibration can be controlled over a wide range by adjusting the moment of inertia of the torsion vibrating member. Even when the resonance frequency of plane vibration significantly differs from the resonance frequency of torsion vibration before the resonance frequency adjusting process, the control of resonance frequency of torsion vibration over a wide range allows both the resonance frequencies to coincide with each other.

According to another preferable application, the torsion vibrating member is adaptable to have an initial moment of inertia round said axis of said support member 2 through 20 times a natural moment of inertia of said first tuning fork-shaped vibrating member round said axis of said support member. In this modification, the resonance frequency of torsion vibration coincides with the resonance frequency of plane vibration with high precision over a narrow adjustment range in adjusting the moment of inertia of the torsion vibrating member.

A ratio of a distance between the torsion vibrating member and the base of the first tuning fork-shaped vibrating member to a whole length of the support member is preferably not greater than 0.5. The close configuration of the torsion vibrating member to the first tuning fork-shaped vibrating member allows the natural frequency of torsion vibration to be varied significantly with a variation in the moment of inertia of the torsion vibrating member round the support member. This enhances the efficiency of adjustment of resonance frequencies of the first tuning fork-shaped vibrating member and the torsion vibrating member.

The invention is also directed to a method of adjusting any one of the vibration-sensing devices described above, for example, where the vibration-sensing device comprises: a first tuning fork-shaped vibrating member having a base, a first vibrating tine and a second vibrating tine, the first and second vibrating tines being joined with each other at the base to form a tuning fork-like shape, the first and second vibrating tines vibrating in a plane where the first and second vibrating tines exist; a support member, joined with the base of the first tuning fork-shaped vibrating member, for supporting the first tuning fork-shaped vibrating member; an outside fixation member for supporting the support member; and a torsion vibrating member comprising a first beam projected from the support member and a first mass control element fixed to the first beam to be arranged apart from the support member, the support member, the first tuning fork-shaped vibrating member, and the torsion vibrating member constituting a torsion vibrating system round an axis of the support member, and the torsion vibrating system causing torsion vibration to the torsion vibrating member.

The method comprises the step of:

providing the above-mentioned vibration-sensing device; and controlling a mass of the torsion vibrating member by adjusting the mass of at least one of the first beam and the first mass control element, thereby setting a predetermined relationship between a resonance frequency of plane vibration of the first tuning fork-shaped vibrating member in the plane and a resonance frequency of torsion vibration of the torsion vibrating member.

In the method of the invention, the resonance frequency is adjusted by controlling the mass of the torsion vibrating member, which is separate from the first tuning fork-shaped vibrating member having plane vibration along the X axis.

The first tuning fork-shaped vibrating member supported by the support member has plane vibration along the X axis as well as torsion vibration driven by the plane vibration and Coriolis forces. The resonance frequency of plane vibration is determined only by the properties of the first tuning fork-shaped vibrating member, such as the rigidity, the thickness, and the shape of tuning fork, whereas the resonance frequency of torsion vibration is determined only by the properties of the torsion vibrating system constituted by the joint of the first tuning fork-shaped vibrating member and the torsion vibrating member with the support member, such as the rigidity and jointing conditions of the support member, the first tuning fork-shaped vibrating member, and the torsion vibrating member. The plane vibration and torsion vibration are vectorially independent vibrations. Torsion vibration of the torsion vibrating member is driven by the torsion vibration propagated to the support member and thus vectorially independent of the plane vibration of the first tuning fork-shaped vibrating member.

Adjusting the mass of at least one of the first beam and the first mass control element to control the mass of the torsion vibrating member allows only the resonance frequency of torsion vibration of the torsion vibrating member to be varied independently. This allows the resonance frequency of plane vibration of the first tuning fork-shaped vibrating member and the resonance frequency of torsion vibration of the torsion vibrating member to hold a predetermined relationship, for example, to coincide with each other.

The mass control of the torsion vibrating member may be implemented by any appropriate method, for example, by cutting, etching, bonding or removing metals of low melting point like solder or silver solder, metal pieces, or organic adhesives to or from at least either the beam or the mass control element.

The invention is further directed to an angular velocity sensor for detecting an angular velocity with any one of the vibration-sensing devices described above, for example, where the vibration-sensing device comprises: a first tuning fork-shaped vibrating member having a base, a first vibrating tine and a second vibrating tine, the first and second vibrating tines being joined with each other at the base to form a tuning fork-like shape, the first and second vibrating tines vibrating in a plane where the first and second vibrating tines exist; a support member, joined with the base of the first tuning fork-shaped vibrating member, for supporting the first tuning fork-shaped vibrating member; an outside fixation member for supporting the support member; and a torsion vibrating member comprising a first beam projected from the support member and a first mass control element fixed to the first beam to be arranged apart from the support member, the support member, the first tuning fork-shaped vibrating member, and the torsion vibrating member constituting a torsion vibrating system round an axis of the support member, and the torsion vibrating system causing torsion vibration to the torsion vibrating member.

The angular velocity sensor comprises:

vibration driving means for driving plane vibration of the first and second vibrating tines of the first tuning fork-shaped vibrating member in the plane; and torsion vibration detecting means for detecting a state of torsion vibration driven in the torsion vibrating system and outputting a signal representing the state of torsion vibration.

In the angular velocity sensor of the invention, the vibration driving means drives plane vibration of the first and second vibrating tines of the first tuning fork-shaped vibrating member. When Coriolis forces act on the first tuning fork-shaped vibrating member under the condition of plane vibration, the torsion vibration detecting means detects the state of torsion vibration driven in the torsion vibrating system by the Coriolis forces and outputs a signal representing the state of torsion vibration. It is not necessary to place the torsion vibration detecting means on the first tuning fork-shaped vibrating member where the vibration driving means is arranged. The torsion vibration detecting means can accordingly be disposed separately from the vibration driving means. This allows the first tuning fork-shaped vibrating member to be used only for driving plane vibration, while another constituent like the torsion vibrating member is used only for the detection of torsion vibration. Separate arrangement of the vibration driving means and the torsion vibration detection means (for example, on the first tuning fork-shaped vibrating member and the torsion vibrating member) reduces the dimensions of the vibration-sensing device and realizes the simplified structure. The detection sensitivity of the angular velocity sensor is further improved by placing the vibration driving means at the root of the first tuning fork-shaped vibrating member causing a large deflection, amplifying the torsion vibration of the torsion vibrating system constituted by the first tuning fork-shaped vibrating member and the torsion vibrating member, and placing the torsion vibration detecting means at a certain site of the torsion vibrating member having a large deflection, for example on the beam.

According to preferable applications, the torsion vibration detecting means comprises any one of:

first torsion vibration detecting means mounted on the torsion vibrating member for detecting a state of torsion vibration driven in the torsion vibrating system and outputting a signal representing the state of torsion vibration;

second torsion vibration detecting means mounted on the first tuning fork-shaped vibrating member for detecting a state of torsion vibration driven in the torsion vibrating system and outputting a signal representing the state of torsion vibration; and third torsion vibration detecting means mounted on the support member for detecting a state of torsion vibration driven in the torsion vibrating system and outputting a signal representing the state of torsion vibration.

In the angular velocity sensor of such structure, one of the first through the third torsion vibration detecting means outputs a signal representing the state of torsion vibration.

The first torsion vibration detecting means may have means for detecting the state of torsion vibration by means of the beam of the torsion vibrating member at a side close to the support member and outputting a signal representing the state of torsion vibration.

The angular velocity sensor detects the state of torsion vibration by means of the beam of the torsion vibrating member at a side close to the support member having a large deflection, thereby detecting the angular velocity with improved sensitivity.

In the case that the vibration-sensing device composed of crystal is incorporated in the angular velocity sensor, the third torsion vibration detecting means preferably comprises means for detecting a shearing stress of the support member caused by the torsion vibration and outputting a signal representing the shearing stress.

Since the longitudinal direction of the support member of the vibration-sensing device coincides with the Y axis of crystal, the piezoelectric constant used for detecting a shearing stress, which is generated on the support member due to the torsion vibration, as an electric signal by the piezoelectric effect of crystal is the entry in the first row and the second column in the matrix of Equation 1. The piezoelectric constant in the first row and the second column is not equal to zero, and accordingly allows the shearing force on the support member to be detected accurately and sensitively as an electric signal representing the magnitude of shearing force.

According to one preferable application, the vibration driving means is provided with:

first vibrating tine driving means for driving plane vibration of the first vibrating tine of the first tuning fork-shaped vibrating member;

second vibrating tine detecting means for detecting a state of plane vibration of the second vibrating tine of the first tuning fork-shaped vibrating member and outputting a signal representing the state of plane vibration; and vibration adjusting means for controlling the first vibrating tine driving means based on the signal output from the second vibrating tine detecting means, and causing the plane vibration of the first vibrating tine and the plane vibration of the second vibrating tine to have opposed phases in the plane.

In the angular velocity sensor of this structure, vibration of the first vibrating tine is certainly made reverse to vibration of the second vibrating tine. Coriolis forces of opposite directions accordingly act on the first vibrating tine and the second vibrating tine of the first tuning fork-shaped vibrating member, thereby driving the torsion vibration without fails.

The angular velocity sensor preferably comprises calculation means for calculating an angular velocity based on the signal output from the torsion vibration detecting means. The calculation means allows the angular velocity acting on a vehicle or any other object with the angular velocity sensor mounted thereon to be detected accurately and sensitively.

The invention is also directed to another angular velocity sensor for detecting an angular velocity with any one of the vibration-sensing devices described above, for example, where the vibration-sensing device comprises: a first tuning fork-shaped vibrating member having a base, a first vibrating tine and a second vibrating tine, the first and second vibrating tines being joined with each other at the base to form a tuning fork-like shape, the first and second vibrating tines vibrating in a plane where the first and second vibrating tines exist; a support member, joined with the base of the first tuning fork-shaped vibrating member, for supporting the first tuning fork-shaped vibrating member; an outside fixation member for supporting the support member; and a torsion vibrating member comprising a first beam projected from the support member and a first mass control element fixed to the first beam to be arranged apart from the support member, the support member, the first tuning fork-shaped vibrating member, and the torsion vibrating member constituting a torsion vibrating system round an axis of the support member, and the torsion vibrating system causing torsion vibration to the torsion vibrating member.

This angular velocity sensor comprises:

torsion vibration driving means for driving torsion vibration in the torsion vibrating system round the support member; and vibration detecting means for detecting a state of plane vibration of the first and second vibrating tines of the first tuning fork-shaped vibrating member in the plane, caused by the torsion vibration driven in the torsion vibrating system, and outputting a signal representing the state of plane vibration.

In the angular velocity sensor of this structure, the torsion vibration driving means drives torsion vibrations of the torsion vibrating member and the support member in order to drive torsion vibration in the torsion vibrating system. The vibration detecting means detects the state of plane vibration of the first vibrating tine and the second vibrating tine of the first tuning fork-shaped vibrating member and outputs a signal representing the state of plane vibration, when an angular velocity acts on the vibration-sensing device. The structure of this angular velocity sensor for driving and detecting vibrations is substantially opposite to that of the above angular velocity sensor.

According to a preferable structure, the angular velocity sensor further comprises calculation means for calculating an angular velocity based on the signal output from the vibration detecting means. The calculation means allows the angular velocity acting on a vehicle or any other object with the angular velocity sensor mounted thereon to be detected accurately and sensitively.

In any of the above angular velocity sensors, the detection sensitivity of the angular velocity is further improved by adjusting the resonance frequency of plane vibration of the first tuning fork-shaped vibrating member and the resonance frequency of torsion vibration of the torsion vibrating member through the mass control process described above.

In the angular velocity sensor of any structure described above, the vibration driving means may be implemented by the reverse piezoelectric effect of piezoelectric material, such as PZT or ZnO, or by the application of electrostatic force, magnetic force, or electromagnetic force to the vibration-sensing device. The vibration detecting means may also be implemented by the piezoelectric effect of piezoelectric material, such as PZT or ZnO, or by the detection of electrostatic force, magnetic force, or electromagnetic force varying with torsion vibration or the detection of distortion varying with torsion vibration by means of a distortion gauge.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
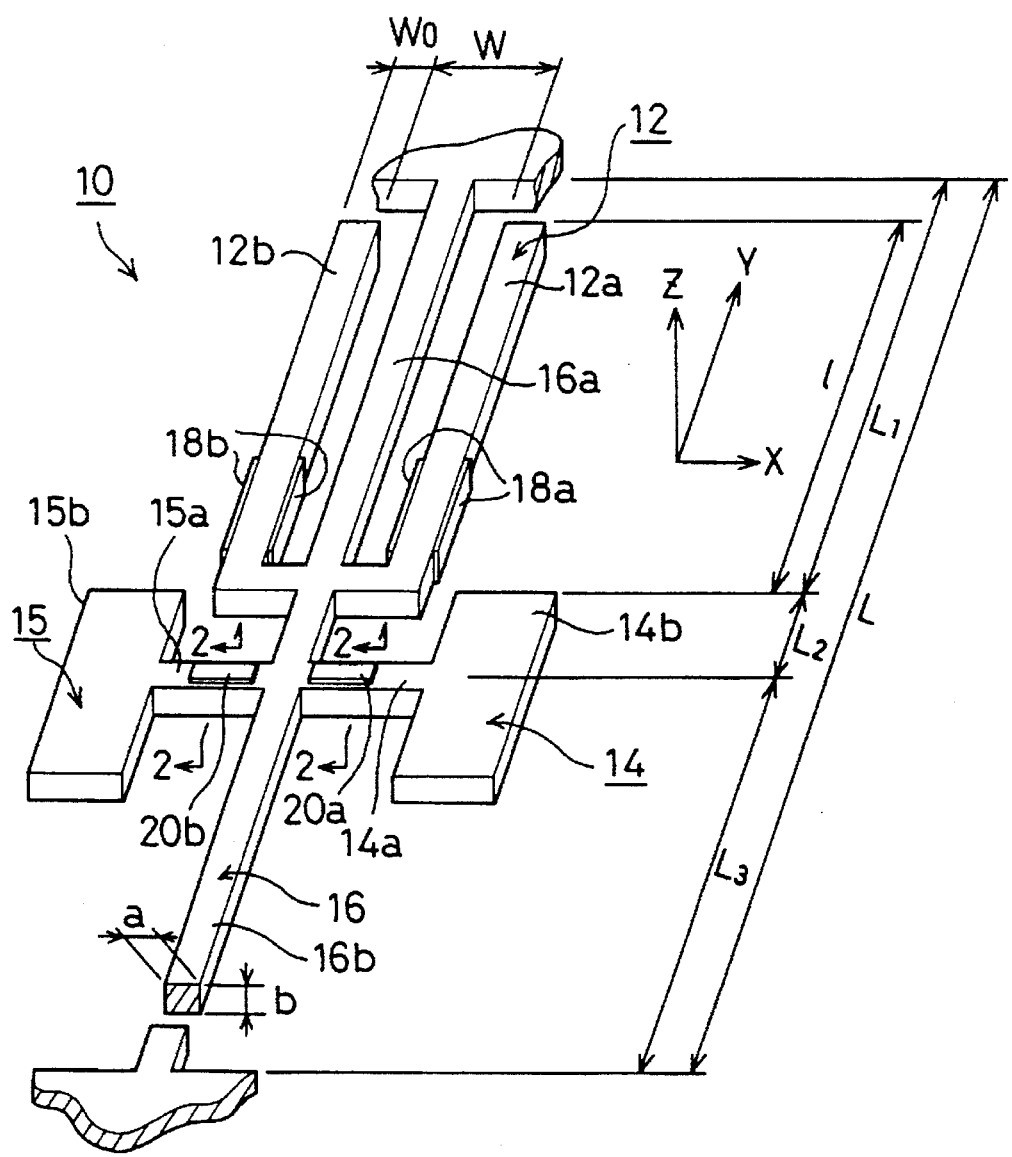
FIG. 1 is a perspective view schematically illustrating a vibration-sensing device 10 incorporated in an angular velocity sensor as a first embodiment according to the invention.

An angular velocity sensor embodying the invention is described with the accompanying drawings. FIG. 1 is a perspective view schematically illustrating a vibration-sensing device 10 incorporated in an angular velocity sensor of the embodiment. The vibration-sensing device 10 of the first embodiment includes vibrating tines or a vibrating member of a tuning fork shape 12 (hereinafter referred to as the first tuning fork-shaped vibrating member), first and second torsion vibrating bodies 14 and 15, and a torsion bar 16, which are all arranged in an identical X-Y plane. The vibration-sensing device 10 is formed to the illustrated shape by machining a plate of vibration-propagating metal like aluminum alloy. The first tuning fork-shaped vibrating member 12 is joined with the torsion bar 16 at a base of a first vibrating tine 12a and a second vibrating tine 12b of the first tuning fork-shaped vibrating member 12. The first and second torsion vibrating bodies 14 and 15 are symmetrically projected from and secured to the torsion bar 16.

The torsion bar 16 includes an upper torsion bar element 16a on the side of the first tuning fork-shaped vibrating member 12 and a lower torsion bar element 16b on the side of the first and second torsion vibrating bodies 14 and 15. The upper torsion bar element 16a and the lower torsion bar element 16b are respectively secured at their ends to a sensor casing frame (not shown). The torsion bar 16 supports the first tuning fork-shaped vibrating member 12 at the base thereof.

The first and second torsion vibrating bodies 14 and 15 include torsion vibrating beams 14a and 15a directly projected from the torsion bar 16, and rectangular mass control elements 14b and 15b arranged on the respective ends of the torsion vibrating beams 14a and 15a to be apart from the torsion bar 16, respectively. Since the first and second torsion vibrating bodies 14 and 15 are projected from the torsion bar 16 in the same plane as the first tuning fork-shaped vibrating member 12, torsion vibration of the torsion bar 16 results in torsion vibration of the torsion vibrating bodies 14 and 15 round the torsion bar 16. The first tuning fork-shaped vibrating member 12, the torsion bar 16, and the torsion vibrating bodies 14 and 15 are linked and joined together to construct a torsion vibrating system. Characteristics of this system, including the rigidity of the torsion bar 16 and the other elements and the state of linkage, define the characteristics of the torsion vibration. The first and second mass control elements 14b and 15b are applied to control the mass in the process of adjusting the resonance frequency as described later. The mass control elements 14b and 15b accordingly have a plate-like top face suitable for the mass increase or decrease by cutting, soldering, or sticking a metal piece in the resonance frequency adjusting process.

Figure 2:
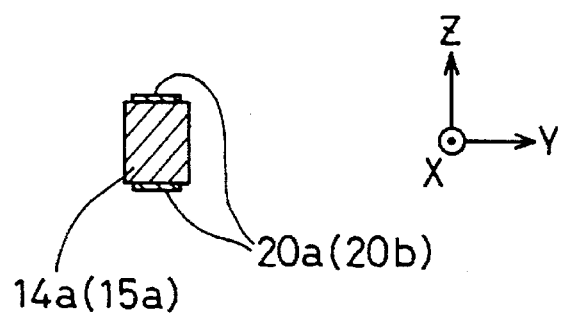
FIG. 2 is an enlarged cross sectional view, taken on the line 2—2 of FIG. 1.

As shown in FIG. 1, a pair of vibration-driving piezoelectric elements 18a, such as PZT are bonded and secured to side faces of the first vibrating tine 12a of the first tuning fork-shaped vibrating member 12 in order to drive plane vibration of the first vibrating tine 12a in the direction of X axis. The second vibrating tine 12b is similarly provided with a pair of vibration-driving piezoelectric elements 18b. Referring to FIG. 1 and the enlarged cross sectional view of FIG. 2 taken on the line 2—2 of FIG. 1, a pair of torsion vibration-detecting piezoelectric elements 20a, such as PZT are bonded and secured to top and bottom faces of the first torsion vibrating beam 14a of the first torsion vibrating body 14, in order to detect distortion of the first torsion vibrating beam 14a caused by torsion vibration of the first torsion vibrating body 14. A pair of torsion vibration-detecting piezoelectric elements 20b are also bonded and secured to top and bottom faces of the second torsion vibrating beam 15a of the second torsion vibrating body 15. The vibration-driving piezoelectric elements 18a and 18b are arranged symmetrically in the vicinity of the base of the vibrating tines 12a and 12b, whereas the torsion vibration-detecting piezoelectric elements 20a and 20b are arranged symmetrically in the vicinity of the base of the torsion vibrating beams 14a and 15a linked with the torsion bar 16.

In order to prevent interference with vibrations of the vibrating tines 12a and 12b and the torsion vibrating beams 14a and 15a, conductive lines (not shown) wired along the torsion bar 16 to the outside via the fixed ends of the torsion bar 16 run through the vibration-driving piezoelectric elements 18a and 18b and the torsion vibration-detecting piezoelectric elements 20a and 20b.

A sensitivity trimming process for making the resonance frequency of plane vibration of the vibrating tines 12a and 12b coincide with the resonance frequency of torsion vibration of the torsion vibrating bodies 14 and 15 is executed after the bonding and fixation of the vibration-driving piezoelectric elements 18a and 18b and the torsion vibration-detecting piezoelectric elements 20a and 20b. Details of the sensitivity trimming process will be described later.

Figure 3:
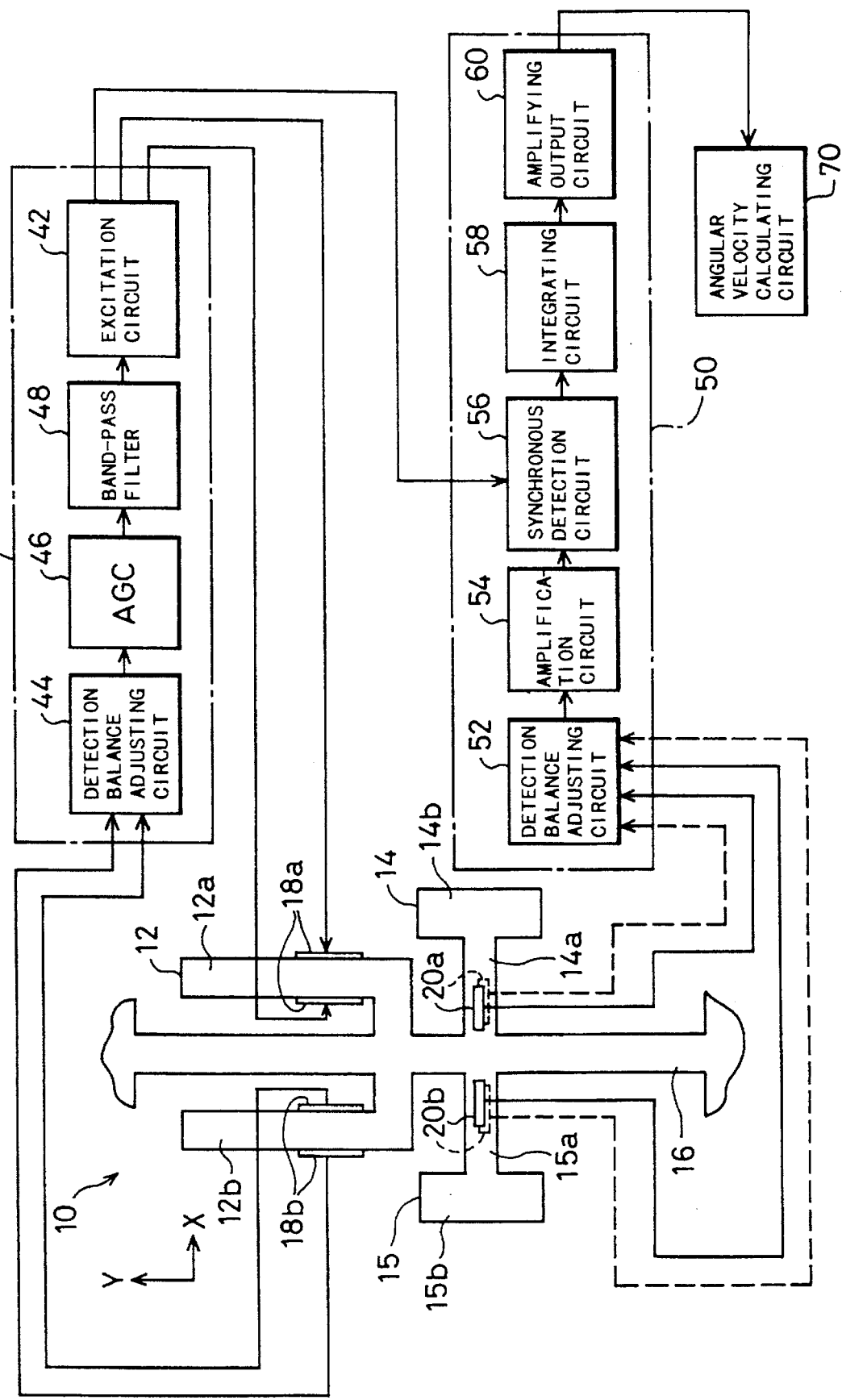
FIG. 3 is a block diagram showing a signal processing circuit including a drive circuit 40 connected to vibration-driving piezoelectric elements 18a and 18b and a detection circuit 50 connected to torsion vibration-detecting piezoelectric elements 20a and 20b.

FIG. 3 is a block diagram illustrating a circuit structure of the angular velocity sensor with the vibration-sensing device 10 thus constructed. The vibration-driving piezoelectric elements 18a and 18b of the first and second vibrating tines 12a and 12b connect with a drive circuit 40, whereas the torsion vibration-detecting piezoelectric elements 20a and 20b of the first and second torsion vibrating beams 14a and 15a connect with a detection circuit 50.

The drive circuit 40 includes an excitation circuit 42 for applying alternating voltages to the pair of vibration-driving piezoelectric elements 18a, a detection balance adjusting circuit 44 for adjusting the phases of electric signals generated by the piezoelectric effect of the pair of vibration-driving piezoelectric elements 18b, an automatic gain controller (AGC) 46 for generating a fixed output level irrespective of the level of input electric signals, and a band-pass filter 48 for extracting electric signals of a predetermined frequency range about the resonance frequency of each vibrating tine 12a or 12b determined by the shape of tuning fork of the first tuning fork-shaped vibrating member 12.

The detection circuit 50 includes a detection balance adjusting circuit 52 for adjusting the phases of electric signals and compensating the electric signals as described later, an amplification circuit 54 for amplifying the output level of electric signals adjusted by the detection balance adjusting circuit 52, a synchronous detection circuit 56 for rectifying the electric signals of alternating voltages synchronously with a reference signal transmitted from the excitation circuit 42, an integrating circuit 58 for converting the positive voltage-electric signals to rectified voltage-electric signals; and an amplifying output circuit 60 for amplifying the output level of the rectified voltage-electric signals.

The detection balance adjusting circuit 52 receives electric signals (alternating voltages) generated by the piezoelectric effect of the two pairs of torsion vibration-detecting piezoelectric elements 20a and 20b, adjusts the phases of the electric signals from the two pairs of torsion vibration-detecting piezoelectric elements 20a and 20b, and compensates the electric signals. The piezoelectric effect of the two pairs of torsion vibration-detecting piezoelectric elements 20a and 20b is ascribed to distortion of the first and second torsion vibrating beams 14a and 15a in the X-Y plane (see FIG. 1) due to torsion vibration of the first and second torsion vibrating bodies 14 and 15.

The following description regards the operation of the vibration-sensing device 10 by the drive circuit 40 and the operation of the vibration-sensing device 10 and the detection circuit 50 under the influence of angular velocity.

The excitation circuit 42 of the drive circuit 40 applies alternating voltages of opposite phases (phase difference by 180 degrees) to the respective vibration-driving piezoelectric elements 18a. Each of the vibration-driving piezoelectric elements 18a expands or shrinks according to the voltage because of the reverse piezoelectric effect. Since the phase of an alternating voltage applied to one of the vibration-driving piezoelectric elements 18a is different by 180 degrees from the same applied to the other vibration-driving piezoelectric element 18a, one vibration-driving piezoelectric element 18a expands while the other shrinking. This results in plane vibration of the first vibrating tine 12a of the first tuning fork-shaped vibrating member 12 along the X axis. The plane vibration of the first vibrating tine 12a is propagated to the other vibrating tine 12b, which accordingly resonates.

The resonance of the second vibrating tine 12b causes the pair of vibration-driving piezoelectric elements 18b to expand or shrink due to the vibration and generate electric signals of alternating voltages according to the expansion and shrinkage of the respective vibration-driving piezoelectric elements 18b by the piezoelectric effect. Since one of the vibration-driving piezoelectric elements 18b expands while the other shrinking, the electric signals generated are alternating voltages of opposite phases (phase difference of 180 degrees). The detection balance adjusting circuit 44 inverts one of the electric signals thus generated to adjust the phases of the electric signals, and the AGC 46 generates a fixed output level. The band-pass filter 48 extracts electric signals of a predetermined range about the resonance frequency, and the excitation circuit 42 applies the selected electric signals to the pair of vibration-driving piezoelectric elements 18a.

The alternating voltage thus applied to the first vibrating tine 12a gives vibration of a fixed level of amplitude at a frequency of vibration of the vibrating tine 12b. The first vibrating tine 12a and the second vibrating tine 12b accordingly generate steady-state vibration of a fixed amplitude at the resonance frequency. Alternating voltages are applied to the vibration-driving piezoelectric elements 18a on the first vibrating tine 12a to vibrate the two vibrating tines 12a and 12b of the first tuning fork-shaped vibrating member 12 coming close to or far apart from each other. The frequency of vibration is set equal to the resonance frequency of each vibrating tine 12a or 12b determined by the shape of tuning fork of the first tuning fork-shaped vibrating member 12. The phase of plane vibration of the first vibrating tine 12a along the X axis is thus different by 180 degrees from the same of the second vibrating tine 12b.

When an angular velocity $\Omega$ is applied round a Y axis while the vibration-sensing device 10 is in the state of steady-state vibration by the drive circuit 40, Coriolis forces F expressed as the formula of $F=2\ mV\Omega$ act on the first and second vibrating tines 12a and 12b in a direction perpendicular to the drawing of FIG. 3 (that is, in the direction of Z axis), where m and V respectively represent a mass and a velocity of vibrating part. The velocity of vibrating part V is expressed by the formula of $V=A\omega\cos\omega t$, where $\omega$ denotes an angular frequency, and proportional to an amplitude A of vibration by the drive circuit 40. The Coriolis force F increases with an increase in the amplitude A of vibration by the drive circuit 40.

The first vibrating tine 12a and the second vibrating tine 12b receive the Coriolis forces F and vibrate in the direction of Z axis. Since vibrations of the two vibrating tines 12a and 12b in the direction of X axis have opposite phases, Coriolis forces F of opposite directions act on the first vibrating tine 12a and the second vibrating tine 12b. For example, a positive Coriolis force F along the Z axis, that is, in the +Z direction, acts on the first vibrating tine 12a, while a negative Coriolis force F along the Z axis, that is, in the −Z direction, acts on the second vibrating tine 12b. When the Coriolis forces F act on the first and second vibrating tines 12a and 12b, the first tuning fork-shaped vibrating member 12 receives a torsional force round the torsion bar 16. Application of an angular velocity round the Y axis to the vibration-sensing device 10 causes the first tuning fork-shaped vibrating member 12 to cooperate with the torsion bar 16 and generate torsion vibration having an amplitude proportional to the angular velocity. The torsion vibration thus generated is then propagated to the torsion bar 16.

The torsion bar 16 to which the torsion vibration is propagated has the first and second torsion vibrating bodies 14 and 15 protruded from the torsion bar 16, as well as the first tuning fork-shaped vibrating member 12. The first and second torsion vibrating bodies 14 and 15 generate torsion vibration inverted with respect to the torsion vibration of the first tuning fork-shaped vibrating member 12 and having an amplitude proportional to the torsion vibration of the first tuning fork-shaped vibrating member 12 or the angular velocity. The reverse torsion vibration of the first and second torsion vibrating bodies 14 and 15 causes the first and second torsion vibrating beams 14a and 15a of the first and second torsion vibrating bodies 14 and 15 to deflect in opposite directions in the X-Y plane. The first and second torsion vibrating beams 14a and 15a are thus under the influence of distortions of opposite directions having a magnitude proportional to the angular velocity. Significant distortion is observed especially at the joint with the torsion bar 16.

The distortions of the first and second torsion vibrating beams 14a and 15a cause the two pairs of torsion vibration-detecting piezoelectric elements 20a and 20b to expand or shrink according to the distortions and generate electric signals of alternating voltages according to the expansion and shrinkage of the torsion vibration-detecting piezoelectric elements 20a and 20b by the piezoelectric effect of these elements 20a and 20b. The electric signal reflects the expansion or shrinkage of each piezoelectric element 20a or 20b and increases its output level with enhancement in expansion or shrinkage. In order to enhance the output level of electric signals for the improved detection sensitivity, the torsion vibration-detecting piezoelectric elements 20a and 20b are required to have significant expansion or shrinkage. For that purpose, it is preferable that the first and second torsion vibrating beams 14a and 15a are deflected to a greater extent to give large distortions.

As described previously, Coriolis forces F of opposite directions act on the first vibrating tine 12a and the second vibrating tine 12b across the torsion bar 16 at identical timings, while the first and second mass control elements 14b and 15b of the first and second torsion vibrating bodies 14 and 15 are disposed apart from the torsion bar 16 via the first and second torsion vibrating beams 14a and 15a. Torsion vibration of the torsion bar 16 and distortions of the torsion vibrating beams 14a and 15a accordingly have amplified displacements. The enhancement in expansion or shrinkage of the torsion vibration-detecting piezoelectric elements 20a and 20b increases the output level of electric signals and thereby heightens the detection sensitivity.

The detection balance adjusting circuit 52 receives the electric signals of alternating voltages generated by the two pairs of torsion vibration-detecting piezoelectric elements 20a and 20b. The detection balance adjusting circuit 52 then adjusts the phases of the electric signals generated by the respective torsion vibration-detecting piezoelectric elements 20a and 20b, and compensates the electric signals based on accelerations acting on the vibration-sensing device 10, such as transverse acceleration and beam-bending acceleration, other than the angular acceleration. The amplification circuit 54 amplifies the output level of electric signals, and the synchronous detection circuit 56 generates positive voltages as a result of synchronous detection corresponding to a reference signal transmitted from the excitation circuit 42. The integrating circuit 58 converts the positive voltage-electric signals to rectified voltage-electric signals, and the amplifying output circuit 60 amplifies the output level of the rectified voltage-electric signals.

In the structure of the embodiment, since the torsion vibration-detecting piezoelectric elements 20a and 20b can generate electric signals of the enhanced output level, the amplification circuit 54 requires only a small amplification factor. Upon condition that the transverse and other accelerations are neglected, only one pair of torsion vibration-detecting piezoelectric elements 20a are sufficient.

Since the distortion of each torsion vibrating beam 14a or 15a is proportional to the angular velocity, the output voltages of the torsion vibration-detecting piezoelectric elements 20a and 20b received by the detection balance adjusting circuit 52 are alternating voltages having an amplitude proportional to the angular velocity. The detection circuit 50 processes signals by referring to the output signal of the drive circuit 40 and outputs a voltage signal proportional to the angular velocity. So that, an angular velocity calculate circuit 70 calculates the angular velocity based on the voltage signal from the detection circuit 50 with sufficiently high sensitivity.

Figure 4:
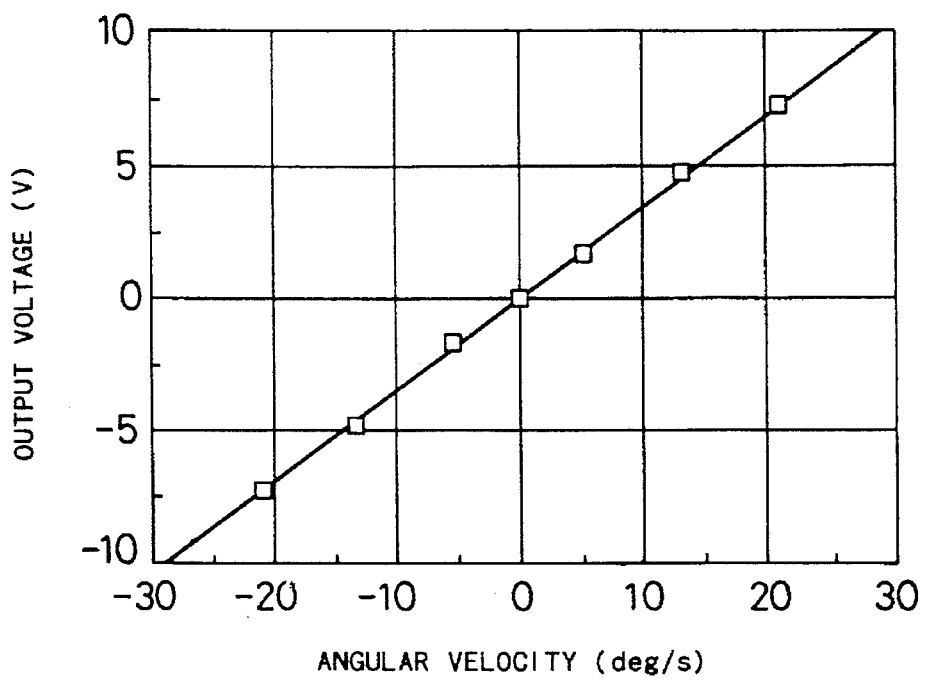
FIG. 4 is a graph showing output characteristics of the angular velocity sensor with the vibration-sensing device 10 of the first embodiment.

Characteristics of the angular velocity sensor with the vibration-sensing device 10 are explained briefly. FIG. 4 is a graph showing the output characteristics or output voltage of the angular velocity sensor plotted against the angular velocity. The graph of FIG. 4 shows that the angular velocity sensor with the vibration-sensing device 10 of the embodiment can detect a wide range of angular velocity with sufficiently high sensitivity.

As described above, the vibration-sensing device 10 of the first embodiment includes the first tuning fork-shaped vibrating member 12 vibrating in the plane and the first and second torsion vibrating bodies 14 and 15, which are linked and joined with the torsion bar 16 having both ends fixed to the sensor casing frame. This structure allows the first and second torsion vibrating bodies 14 and 15 to cause torsion vibration of the magnitude proportional to the angular velocity. In the vibration-sensing device 10 of the first embodiment, the first tuning fork-shaped vibrating member 12 is used only for driving plane vibration in the direction of X axis, whereas the first and second torsion vibrating bodies 14 and 15 are used only for detecting torsion vibration dependent upon the angular velocity. It is thus not required to mount plural pairs of piezoelectric elements on one vibrating tine, thereby reducing the size of the vibrating-sensing device and simplifying the structure. The vibration-sensing device 10 of the first embodiment can drive vibration of the vibrating tines 12a and 12b at its root causing a large deflection, and detect torsion vibration at the root of the torsion vibrating bodies 14 and 15 having a large deflection. This effectively enhances the efficiency of driving plane vibration of the first tuning fork-shaped vibrating member 12, which is essential for detecting the angular velocity, and improves the detection sensitivity of the angular velocity sensor with the vibration-sensing device 10.

In the vibration-sensing device 10 of the first embodiment, the first and second torsion vibrating bodies 14 and 15 are projected from the torsion bar 16 independently of the first tuning fork-shaped vibrating member 12. Torsion vibration of the first and second torsion vibrating bodies 14 and 15 is reverse to torsion vibration of the first tuning fork-shaped vibrating member 12. This structure of the vibration-sensing device 10 well balances the moment of inertia round the torsion bar 16 accompanied with the torsion vibrations of opposite directions, and effectively prevents the energy of torsion vibration from leaking from the torsion bar 16 to the outside frame. Stabilization of plane vibration of the first tuning fork-shaped vibrating member 12 and torsion vibration of the first and second torsion vibrating bodies 14 and 15 results in the enhanced quality factor Q of the vibration-sensing device 10, thereby realizing a further improvement in detection sensitivity and maintaining the improved sensitivity. No-leakage of vibration simplifies the method of fixing the vibration-sensing device 10 to the frame and the structure of the sensor housing. The angular velocity sensor thus constructed with the vibration-sensing device 10 of the first embodiment does not require any expensive, complicated structure like a vibration-insulating mechanism and has excellent temperature properties.

In the vibration-sensing device 10 of the first embodiment, Coriolis forces F of opposite directions act on the first vibrating tine 12a and the second vibrating tine 12b round the torsion bar 16, while the mass control elements 14b and 15b are disposed apart from the torsion bar 16 by the torsion vibrating beams 14a and 15a. This structure amplifies the amplitude of torsion vibration, thereby improving the detection sensitivity of the angular velocity.

The excellent effects including an improvement in sensitivity can be attained by fixing both ends of the torsion bar 16, which the first tuning fork-shaped vibrating member 12 and the first and second torsion vibrating bodies 14 and 15 are linked and connected with, to the outside sensor casing frame. Fixing both ends of the torsion bar 16 to the outside frame effectively stabilizes the vibration-sensing device 10 to have a structure of sufficient resistance against the external impacts and vibrations.

As described previously, the sensitivity trimming is executed by adjusting the resonance frequency of the vibration-sensing device 10 after the bonding and fixation of the vibration-driving piezoelectric elements 18a and 18b and the torsion vibration-detecting piezoelectric elements 20a and 20b. The following are reasons why the resonance frequency adjustment of the embodiment can make the resonance frequency of plane vibration of the vibrating tines 12a and 12b coincide with the resonance frequency of torsion vibration of the torsion vibrating bodies 14 and 15.

When an angular velocity is applied to the vibration-sensing device 10, the first tuning fork-shaped vibrating member 12 receives the Coriolis forces to cause torsion vibration. Since the first tuning fork-shaped vibrating member 12 and the first and second torsion vibrating bodies 14 and 15 are joined with the torsion bar 16, the torsion vibrating bodies 14 and 15 generate torsion vibration in connection with the vibration of the first tuning fork-shaped vibrating member 12. The first tuning fork-shaped vibrating member 12 and the torsion vibrating bodies 14 and 15 vibrate at identical torsion resonance frequencies. Vibration driven in the vibration-sensing device 10 is, however, plane vibration of the first tuning fork-shaped vibrating member 12 in the direction of X axis, while vibration detected is torsion vibration of the first and second torsion vibrating bodies 14 and 15 in the direction of Z axis. The resonance frequency of plane vibration of the first tuning fork-shaped vibrating member 12 is thus not always identical with the resonance frequency of torsion vibration of the first and second torsion vibrating bodies 14 and 15, although the tuning fork-shaped vibration member 12 and the torsion vibrating bodies 14 and 15 are joined with the torsion bar 16. As is known, torsion vibration is determined by a torsional spring constant or torsional rigidity k and a moment of inertia J of the torsion bar 16. The moment of inertia J depends upon a distance L from torsional center and a mass m. The resonance frequency of torsion vibration is varied with a variation in mass at a site apart from the torsional center (the axial center of the torsion bar 16 in the embodiment). This allows a desired relationship to be set up between the resonance frequency of driven plane vibration of the first tuning fork-shaped vibrating member 12 and the resonance frequency of detected torsion vibration of the first and second torsion vibrating bodies 14 and 15. For example, the resonance frequency of detected torsion vibration may be made identical with the resonance frequency of driven plane vibration.

In this embodiment, the resonance frequency of plane vibration of the first tuning fork-shaped vibrating member 12 and the resonance frequency of torsion vibration of the torsion vibrating bodies 14 and 15 are adjusted by increasing or decreasing the mass. For increasing the mass, metal pieces are securely attached onto the plate-like top surface of the mass control elements 14b and 15b attached to the respective ends of the first and second torsion vibrating bodies 14 and 15. The mass is decreased by cutting out part of the mass control elements 14b and 15b or part of metal pieces attached to the plate-like top surface. Details of the adjustment process are described below.

Figure 5A:
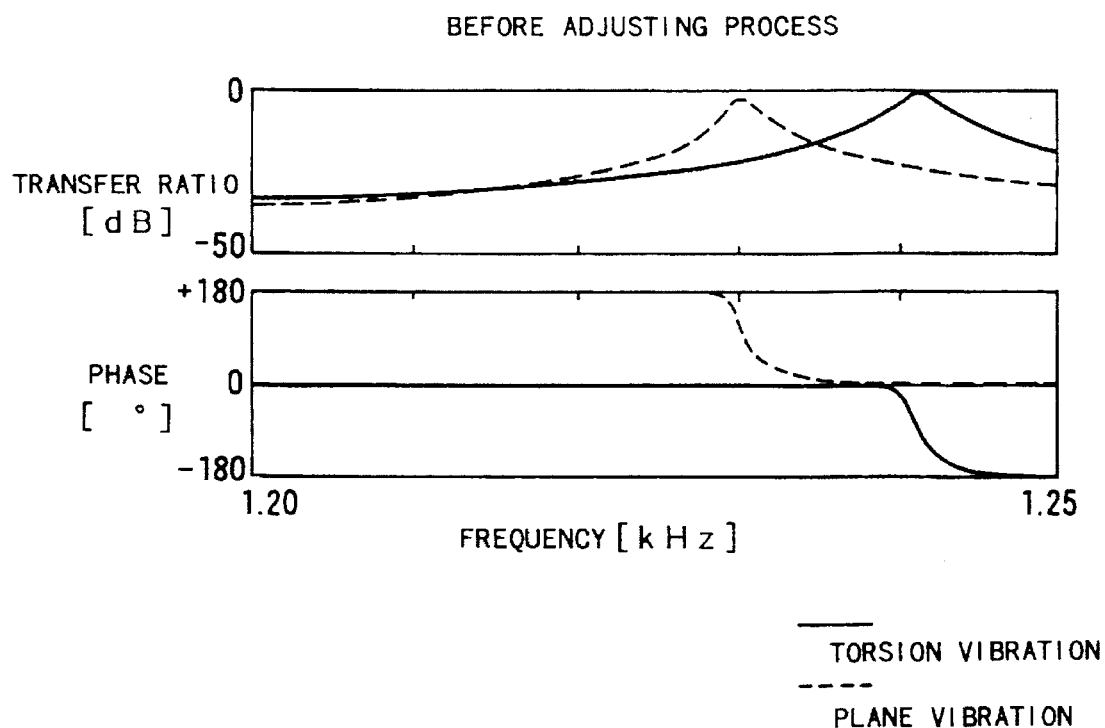
FIG. 5 shows vibration characteristics of the vibration-sensing device 10 before and after the resonance frequency adjusting process executed in the first embodiment.
Figure 5B:
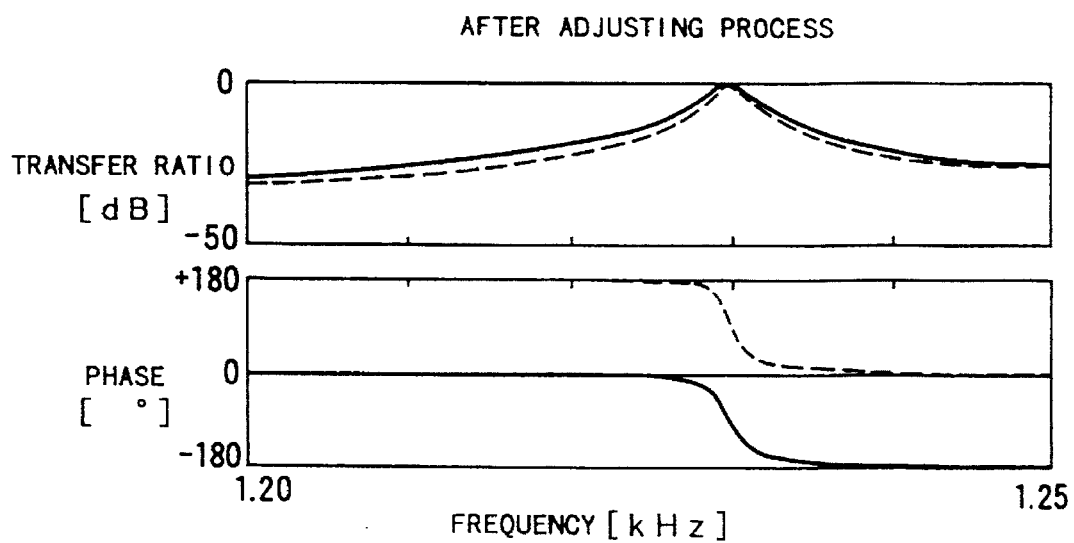

FIG. 5 shows vibration characteristics of the vibration-sensing device 10 before and after the resonance frequency adjusting process executed in the embodiment. FIG. 5A illustrates the vibration characteristics before the resonance frequency adjusting process, and FIG. 5B shows the same after the resonance frequency adjusting process. In the graphs of FIGS. 5A and 5B, doted lines represent the vibration characteristics of plane vibration of the first tuning fork-shaped vibrating member 12, whereas solid lines represent the vibration characteristics of torsion vibration in the torsion vibrating system formed by the linkage of the first tuning fork-shaped vibrating member 12, the torsion bar 16, and the first and second torsion vibrating bodies 14 and 15.

As clearly seen in FIG. 5A, as to the behavior of transfer ratio and phase, the resonance frequency of plane vibration does not coincide with the resonance frequency of torsion vibration before the resonance frequency adjusting process. These phenomena are not characteristic of the vibration-sensing device 10 of the first embodiment having the shape and structure described above, but are found in common in any vibration-sensing devices generating both plane vibration and torsion vibration. The mass control process with the mass control elements 14b and 15b executed for the vibration-sensing device 10 having such characteristics allows the resonance frequency of plane vibration to coincide with the resonance frequency of torsion vibration, as shown in FIG. 5B.

In this example shown in FIGS. 5A and 5B, the resonance frequency of plane vibration is lower than the resonance frequency of torsion vibration before the mass control process with the mass control elements 14b and 15b. The resonance frequency of torsion vibration should accordingly be lowered to coincide with the resonance frequency of plane vibration. For that purpose, metal pieces of appropriate mass are securely attached onto the plate-like top surface of the first and second mass control elements 14b and 15b to increase the mass of the mass control elements 14b and 15b. When the resonance frequency of plane vibration is higher than the resonance frequency of torsion vibration before the mass control process, on the other hand, the resonance frequency of torsion vibration should be raised to coincide with the resonance frequency of plane vibration. For that purpose, part of the mass control elements 14b and 15b or part or all of metal pieces previously attached to the plate-like top surface may be cut or removed to decrease the mass of the mass control elements 14b and 15b. The degree of mass control with the mass control elements 14b and 15b depends upon the shape and the material of the vibration-sensing device 10. The mass increase or decrease should be based on the monitored resonance frequency of torsion vibration.

As shown in FIGS. 5A and 5B, the resonance frequency of plane vibration of the first tuning fork-shaped vibrating member 12 varies only slightly before and after the resonance frequency adjusting process. This indicates that plane vibration is substantially independent of torsion vibration. Such independency allows only the resonance frequency of torsion vibration to be significantly varied by the mass control process to coincide with the resonance frequency of plane vibration. This is ascribed to the fact that the mass control elements 14b and 15b of the torsion vibrating bodies 14 and 15 are only responsible for torsion vibration and are not directly related to plane vibration of the first tuning fork-shaped vibrating member 12.

Figure 6:
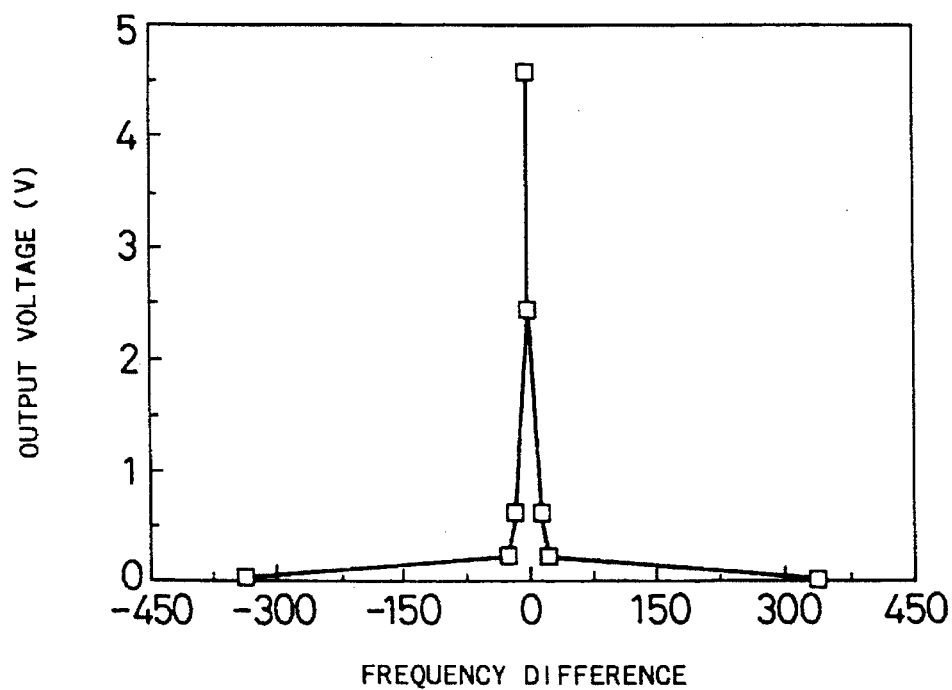
FIG. 6 is a graph showing the sensor output (output voltage) plotted against the frequency difference Δf between a resonance frequency fx of plane vibration and a resonance frequency fz of torsion vibration.

The adjustment of the resonance frequency of plane vibration and that of torsion vibration makes the following contributions. FIG. 6 is a graph showing the sensor output (output voltage) plotted against the frequency difference $\Delta f$ between a resonance frequency fx of plane vibration and a resonance frequency fz of torsion vibration. As clearly seen in FIG. 6, the smaller frequency difference $\Delta f$ between the resonance frequencies fx and fz, that is, the better agreement between the resonance frequencies fx and fz, remarkably improves the detection sensitivity of the angular velocity sensor. The vibration-sensing device 10 undergoing the resonance frequency adjusting process to make the resonance frequency fz coincide with the resonance frequency fx provides an angular velocity sensor with high sensitivity.

In the vibration-sensing device 10 of the first embodiment, adjustment of the resonance frequency fx of plane vibration and the resonance frequency fz of torsion vibration is based on the dimensions and relative positions of the first tuning fork-shaped vibrating member 12 and the torsion vibrating bodies 14 and 15, as described below.

As shown in FIG. 1, the vibration-sensing device 10 is a fixed beam, where both ends of the torsion bar 16 are fixed to the frame and the first tuning fork-shaped vibrating member 12 and the torsion vibrating bodies 14 and 15 are arranged as two masses on the beam. Torsion vibration of the vibration-sensing device 10 can thus be analyzed using a model of torsion vibrating system shown in FIG. 7.

Figure 7:
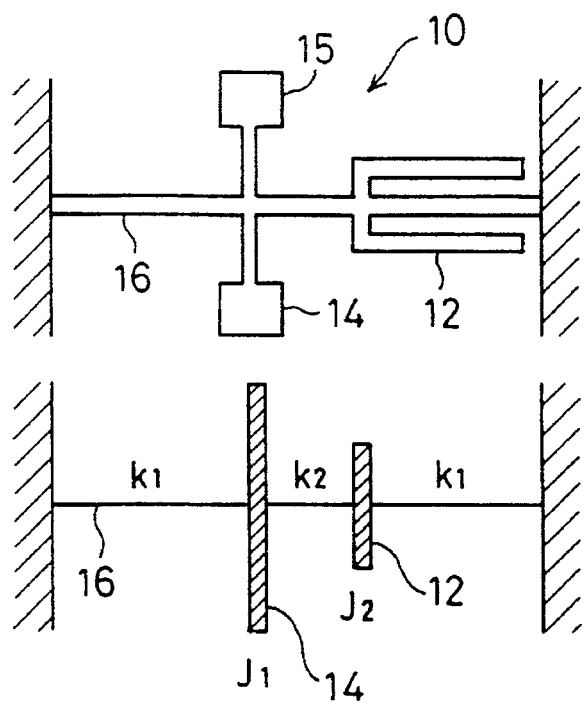
FIG. 7 shows a model of torsion vibrating system used for describing the relationship between the adjustment of the resonance frequency fx of plane vibration and the resonance frequency fz of torsion vibration and the dimensions and relative positions of the first tuning fork-shaped vibrating member 12 and the torsion vibrating bodies 14 and 15 in the vibration-sensing device 10.

A natural frequency f of torsion vibration in the model of torsion vibrating system of FIG. 7 is expressed as:

$$f = p/2\pi \qquad \text{[Equation 2]}$$

$$p_{11}^2 = (k1 + k2)/J_1$$

$$p_{22}^2 = (k1 + k2)/J_2$$

$$p_{12}^2 = k2/\sqrt{J_1 J_2}$$

$$p^2 = \frac{1}{2}(p_{11}^2 + p_{22}^2) + \frac{1}{2}\sqrt{(p_{11}^2 - p_{22}^2)^2 + 4p_{12}^4}$$

where p represents a natural angular frequency of the vibrating model; k1 and k2 torsional rigidity of the torsion bar 16 at respective sites separated by the first tuning fork-shaped vibrating member 12 and the torsion vibrating bodies 14 and 15; and J1 and J2 the moment of inertia of the torsion vibrating bodies 14 and 15 and the first tuning fork-shaped vibrating member 12. In Equation 2, p11, p22, and p21 denote a natural angular frequency of J1 in the torsion vibrating system and an additional torsional spring system, the same of J2 in the torsion vibrating system and an additional torsion spring system, and the same of J1 and J2, respectively.

On the assumption that the cross section of the torsion bar 16 is a rectangle defined by a length 'a' of longer side and a length 'b' of shorter side, the torsional rigidity k of the torsion bar 16 is given by:

[Equation 3]

$$k = k_{ab} \cdot a \cdot b^3 \cdot G$$

where G represents a modulus of rigidity for the material of the torsion bar 16; and $k_{ab}$ denotes a variable defined by the ratio of cross-sectional sides a/b. When a/b=1, that is, when the cross section is a square, kab=0.140.

For a distance r between an arbitrary small mass dm in the object and the rotation axis, the moment of inertia J1 of the torsion vibrating bodies 14 and 15 is defined as:

[Equation 4]

$$J1 = \int r^2 dm$$

The moment of inertia J2 of the mass having the shape of tuning fork, like the first tuning fork-shaped vibrating member 12, is not free from the influence of rigidity of the tuning fork and can not be estimated by theoretical equations. A value calculated by the finite element method (FEM) is accordingly used for the moment of inertia J2.

Plane vibration and torsion vibration of the vibration-sensing device 10 of the first embodiment were analyzed with these equations. As a result of such analysis, a relationship shown in FIG. 8 has been found to hold between the moment of inertia J1 of the torsion vibrating bodies 14 and 15 and the moment of inertia J2 of the first tuning fork-shaped vibrating member 12. Dimensions of the vibration-sensing device 10 are given below (see FIG. 19):

Whole length L of the torsion bar 16: 99.5 mm

Distance L2 between the first tuning fork-shaped vibrating member 12 and the torsion vibrating bodies 14 and 15: 5 mm Distance L1 between the fixed end of the upper torsion bar element 16a and the joint of the first tuning fork-shaped vibrating member 12: 45 mm Distance L3 between the fixed end of the lower torsion bar element 16b and the joint of the torsion vibrating bodies 14 and 15: 45 mm (=L1)

Length 'a' of the longer side of cross section of the torsion bar 16: 3 mm

Length 'b' of the shorter side of cross section of the torsion bar 16: 3 mm

Figure 8:
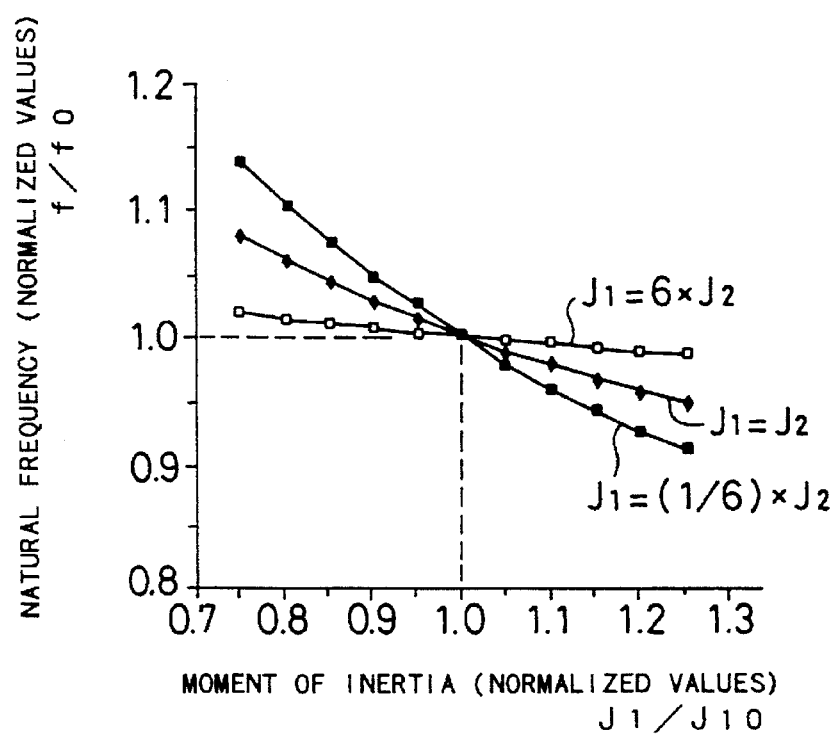
FIG. 8 is a graph showing the relationship between the moment of inertia J1 of the torsion vibrating bodies 14 and 15 and the moment of inertia J2 of the first tuning fork-shaped vibrating member 12.

Effective length 'l' of the vibrating tines 12a and 12b of the first tuning fork-shaped vibrating member 12: 4 mm Opening width 'w' of the first tuning fork-shaped vibrating member 12: 3 mm Width 'w0' of each vibrating tine 12a or 12b: 2.8 mm In this vibration-sensing device 10, the moment of inertia J2 of the first tuning fork-shaped vibrating member 12 was determined to be $8.07 \times 10^{-9}$ kgs$^2$m by the finite element method (FEM). As the moment of inertia J1 of the torsion vibrating bodies 14 and 15 was varied by increasing or decreasing the mass of the mass control elements 14b and 15b, the relationship between the moment of inertia J1 and the natural frequency f of the torsion vibrating model was determined for the fixed moment of inertia J2 (=$8.07 \times 10^{-9}$ kgs$^2$m) of the first tuning fork-shaped vibrating member 12. The results are shown in FIG. 8. Since the direction of plane vibration of the first tuning fork-shaped vibrating member 12 is perpendicular to that of torsion vibration of the torsion vibrating bodies 14 and 15 in the vibration-sensing device 10 as shown by the perspective view of FIG. 1, a variation in the moment of inertia J1 of the torsion vibrating bodies 14 and 15 does not theoretically affect the natural frequency of plane vibration of the first tuning fork-shaped vibrating member 12.

As the moment of inertia J1 was varied with respect to the initial moment of inertia J10, the variation in natural frequency f was measured in order to determine the relationship between the moment of inertia J1 and the natural frequency f. Namely the normalized value (f/f0) obtained by normalizing the natural frequency f by the initial natural frequency f0 was plotted against the normalized value (J1/J10) obtained by normalizing the moment of inertia J1 by the initial moment of inertia J10.

The initial value was set as J1=J2, that is, making the moment of inertia J1 of the torsion vibrating bodies 14 and 15 coincide with the moment of inertia J2 of the first tuning fork-shaped vibrating member 12. Only the moment of inertia J1 was varied in a range of −30% to +30% with respect to the initial moment of inertia J10(=J2) by increasing or decreasing the mass of the mass control elements 14b and 15b, and the natural frequency f(f/f0) was measured against the moment of inertia J1(J1/J10). The results obtained are shown by the curve of closed diamonds in FIG. 8, where the initial natural frequency f0 represents the natural frequency f under the condition of initial setting as J1=J2.

In the initial setting of J1=J2, the natural frequency f of torsion vibration was varied in a range of approximately −7% to +7% by varying only the moment of inertia J1 in a range of −30% to +30% with respect to the initial moment of inertia J10(=J2).

In another initial setting of J1=6×J2, only the moment of inertia J1 of the torsion vibrating bodies 14 and 15 was varied in a range of −30% to +30% with respect to the initial moment of inertia J10(=6×J2), and the natural frequency f(f/f0) was measured against the moment of inertia J1(J1/J10). The results obtained are shown by the curve of open squares in FIG. 8, where the initial natural frequency f0 represents the natural frequency f under the condition of initial setting as J1=6×J2.

In the initial setting of J1=6×J2, the natural frequency f of torsion vibration was varied in a range of approximately −2% to +2% by varying only the moment of inertia J1 in a range of −30% to +30% with respect to the initial moment of inertia J10(=6×J2).

In still another initial setting of J1=(1/6)×J2, only the moment of inertia J1 of the torsion vibrating bodies 14 and 15 was varied in a range of −30% to +30% with respect to the initial moment of inertia J10(=(1/6)×J2), and the natural frequency f(f/f0) was measured against the moment of inertia J1(J1/J10). The results obtained are shown by the curve of closed squares in FIG. 8, where the initial natural frequency f0 represents the natural frequency f under the condition of initial setting as J1=(1/6)×J2.

In the initial setting of J1=(1/6)×J2, the natural frequency f of torsion vibration was varied in a range of approximately −12% to +12% by varying only the moment of inertia J1 in a range of −30% to +30% with respect to the initial moment of inertia J10(=(1/6)×J2).

The resonance frequency of torsion vibration can be controlled over a wide range by setting the initial moment of inertia J10 of the torsion vibrating bodies 14 and 15 1 through 0.1 times the moment of inertia J1 of the first tuning fork-shaped vibrating member 12, or more concretely by selecting the dimensions and material of the vibration-sensing device 10 to fulfill such relationship. Even when the resonance frequency of plane vibration significantly differs from the resonance frequency of torsion vibration before the resonance frequency adjusting process, the control of resonance frequency of torsion vibration over a wide range allows both the resonance frequencies to coincide with each other.

In order to make the resonance frequency of torsion vibration coincide with the resonance frequency of plane vibration with high precision over a narrow adjustment range, on the other hand, the initial moment of inertia J10 of the torsion vibrating bodies 14 and 15 is set 2 through 20 times the moment of inertia J2 of the first tuning fork-shaped vibrating member 12. The resonance frequency adjusting process executed in the embodiment can change its adjustment range of resonance frequency according to the requirements.

Figure 9:
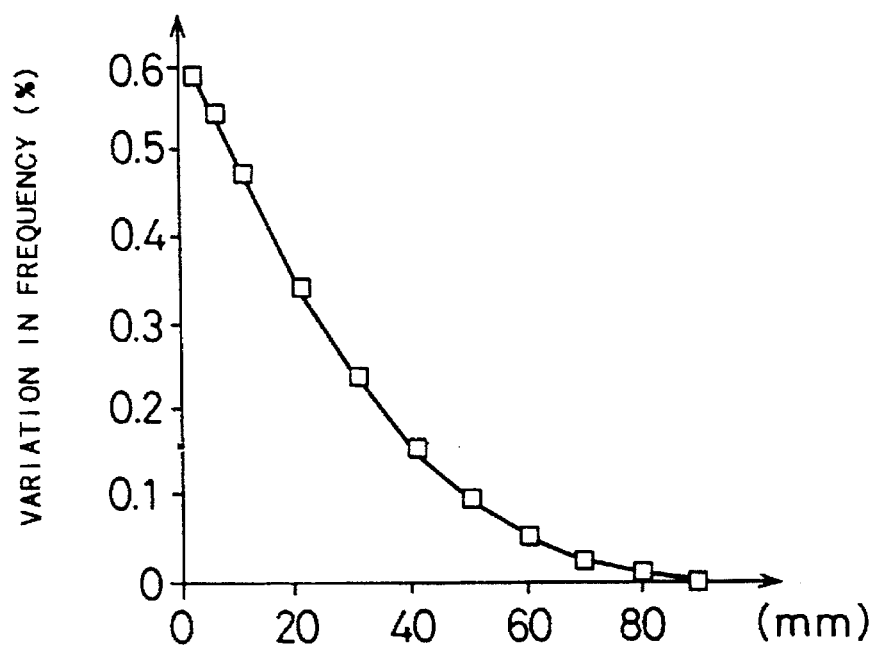
FIG. 9 is a graph showing the variation of natural frequency f of the torsion vibration plotted against the distance L2 between the first tuning fork-shaped vibrating member 12 and the torsion vibrating bodies 14 and 15.

The following description relates to the relationship between the relative positions of the first tuning fork-shaped vibrating member 12 and the torsion vibrating bodies 14 and 15 in the vibration-sensing device 10 of the first embodiment and the adjustment of the resonance frequency fx of plane vibration and the resonance frequency fz of torsion vibration. Torsion vibration characteristics of the above torsion vibrating system are varied according to the relative positions of the first tuning fork-shaped vibrating member 12 and the torsion vibrating bodies 14 and 15 in the fixed whole length L of the torsion bar 16. The distance L2 between the first tuning fork-shaped vibrating member 12 and the torsion vibrating bodies 14 and 15 is varied under the condition of the fixed whole length L of the torsion bar 16 (=99.5 mm). FIG. 9 is a graph showing the variation of natural frequency f in the torsion vibrating model plotted against the distance L2, where the moment of inertia J2 of the first tuning fork-shaped vibrating member 12 and the moment of inertia J1 of the torsion vibrating bodies 14 and 15 are $8.07 \times 10^{-9}$ $kgs^2m$ and $5.05 \times 10^{-8}$ $kgs^2m$ (about 6 times the moment of inertia J2), respectively.

The graph of FIG. 9 was obtained while the whole length L of the torsion bar 16 was fixed to 99.5 mm. Several vibration-sensing devices 10 were prepared to have the various distances L2 between the first tuning fork-shaped vibrating member 12 and the torsion vibrating bodies 14 and 15 as shown in the abscissa of the graph. Each vibration-sensing device 10 was adjusted to satisfy a predetermined initial state for the moment of inertia J1 of the torsion vibrating bodies 14 and 15 and the moment of inertia J2 of the first tuning fork-shaped vibrating member 12, for example, J1=6×J2. In each vibration-sensing device 10, the variation in natural frequency f of torsion vibration was measured by increasing the moment of inertia J1 by 10% from the initial state. The values measured for the respective vibration-sensing devices 10 were plotted against the distance L2.

As shown in the graph of FIG. 9, the shorter distance L2 between the first tuning fork-shaped vibrating member 12 and the torsion vibrating bodies 14 and 15, that is, the smaller L2/L, more significantly varies the natural frequency of torsion vibration with a variation in the moment of inertia J1 of the torsion vibrating bodies 14 and 15. Determining the position of the first tuning fork-shaped vibrating member 12 relative to the torsion vibrating bodies 14 and 15 to decrease the ratio L2/L leads to a significant variation in natural frequency of torsion vibration, thereby enhancing the adjustment efficiency of resonance frequency. The ratio L2/L is preferably not greater than 0.5 (=42.5/95).

Figure 10:
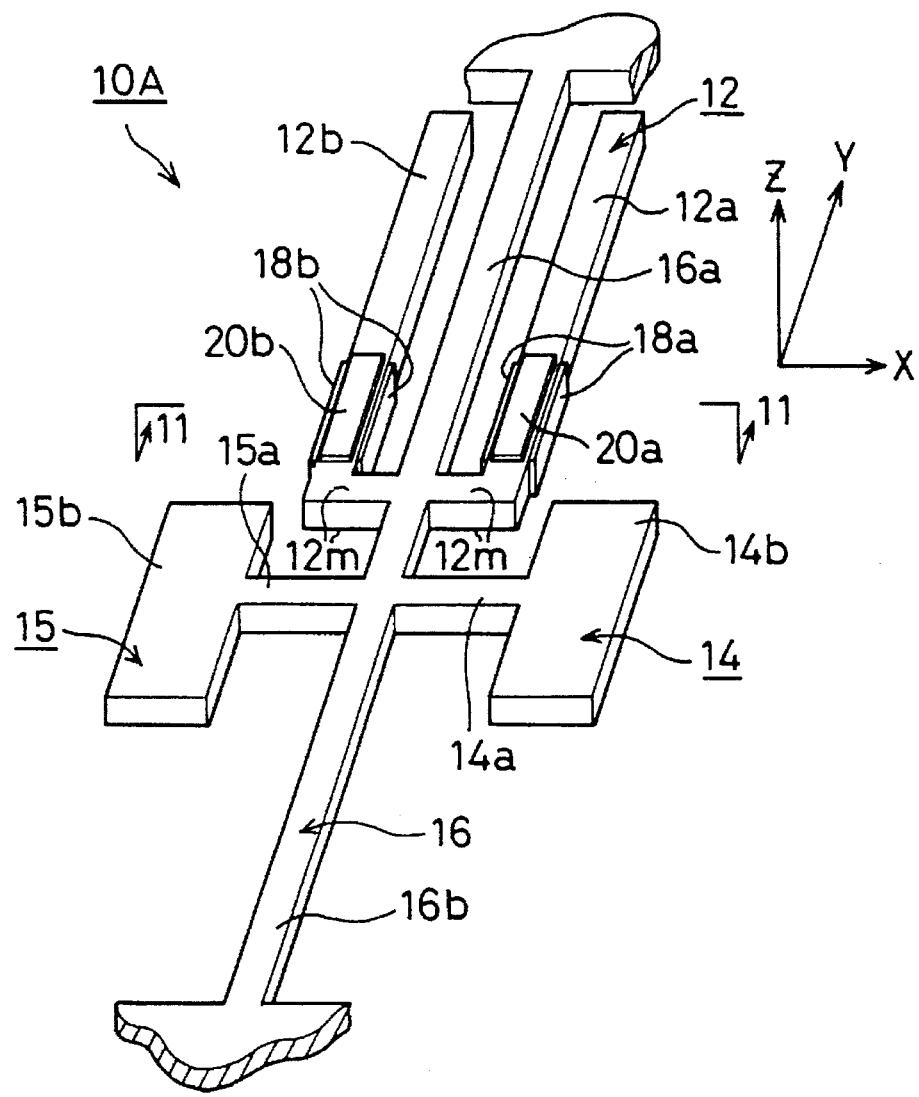
FIG. 10 is a perspective view schematically illustrating a vibration-sensing device 10A as a second embodiment according to the invention.
Figure 11:
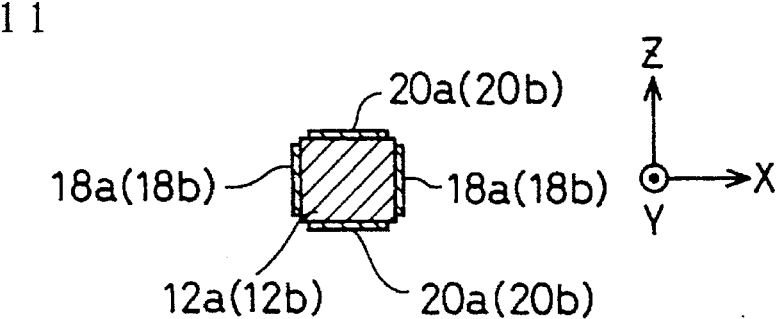
FIG. 11 is an enlarged cross sectional view, taken on the line 11—11 of FIG. 10.

FIG. 10 is a perspective view schematically illustrating a vibration-sensing device 10A as a second embodiment according to the invention. The vibration-sensing device 10A of the second embodiment has substantially the same appearance and constituents as those of the vibration-sensing device 10 of the first embodiment, although the two pairs of torsion vibration-detecting piezoelectric elements 20a and 20b are arranged at different positions. As shown in FIG. 10 and the enlarged cross sectional view of FIG. 11 taken on the line 11—11 of FIG. 10, in the vibration-sensing device 10A, the torsion vibration-detecting piezoelectric elements 20a and 20b are attached to top and bottom faces of the respective roots of the first and second vibrating tines 12a and 12b in the vicinity of the base of the first tuning fork-shaped vibrating member 12.

When an angular velocity acts on the vibration-sensing device 10A to cause torsion vibration in the torsion vibrating system, the torsion vibration subsequently generates a bending stress in the direction of Z axis on the first and second vibrating tines 12a and 12b of the first tuning fork-shaped vibrating member 12. While the torsion vibration generates a bending stress on the vibrating tine 12b, the distortion due to the bending stress is detected at the roots of the first and second vibrating tines 12a and 12b by means of the piezoelectric effect of the torsion vibration-detecting piezoelectric elements 20a and 20b disposed at the respective roots of the vibrating tines 12a and 12b. The structure of the second embodiment allows the vibration-sensing device 10A to form a torsion vibrating system substantially identical with that of the vibration-sensing device 10 of the first embodiment, thus realizing the same effects as the structure of the first embodiment.

In the vibration-sensing device 10A of the second embodiment, the torsion vibration-detecting piezoelectric elements 20a and 20b are disposed close to the vibration-driving piezoelectric elements 18a and 18b without causing any interference. This structure simplifies the bonding and wiring process of the piezoelectric elements, thereby reducing the time and cost required for manufacturing the vibration-sensing device.

Figure 12:
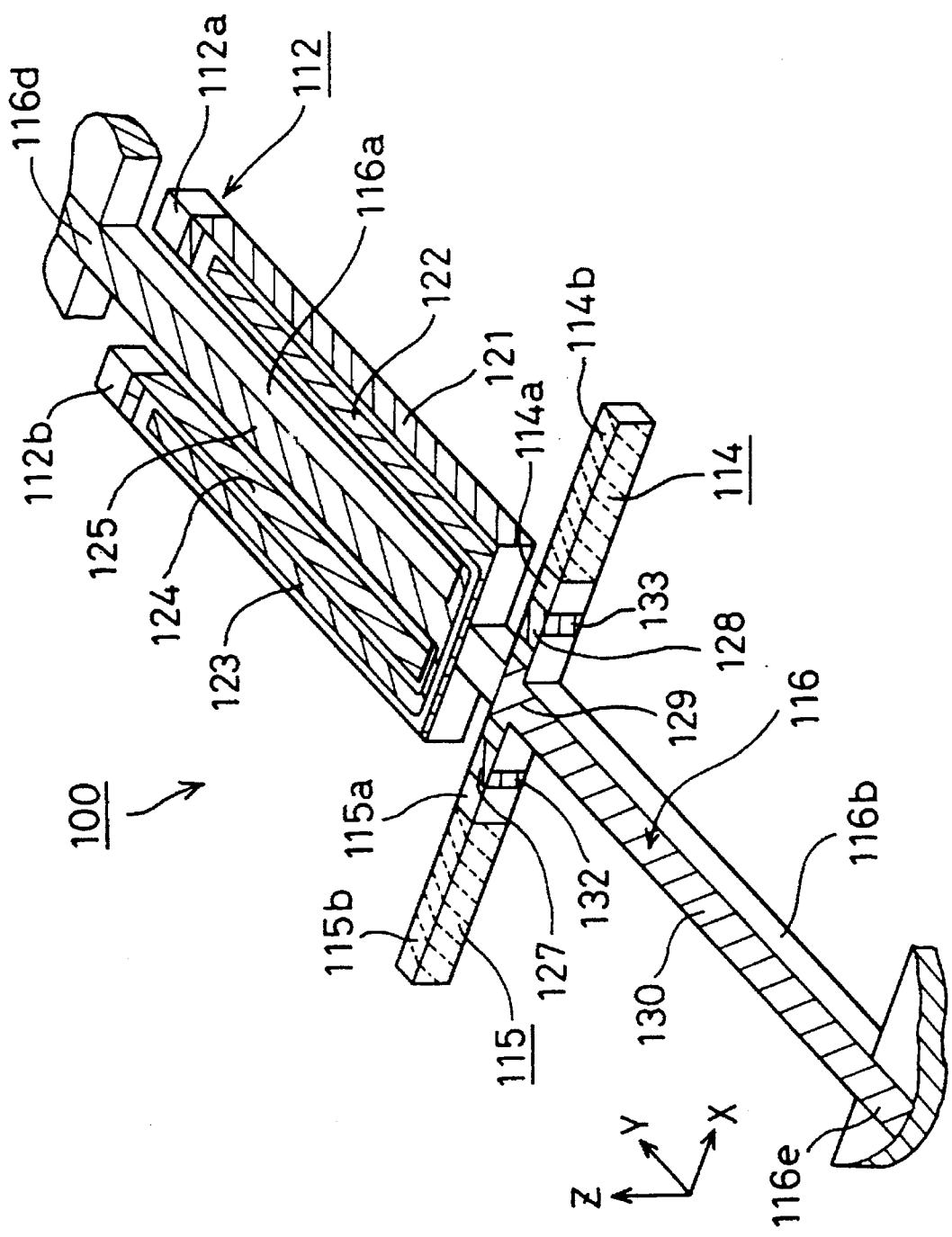
FIG. 12 is a perspective view schematically illustrating an upper face of a vibration-sensing device 100 as a third embodiment according to the invention.
Figure 13:
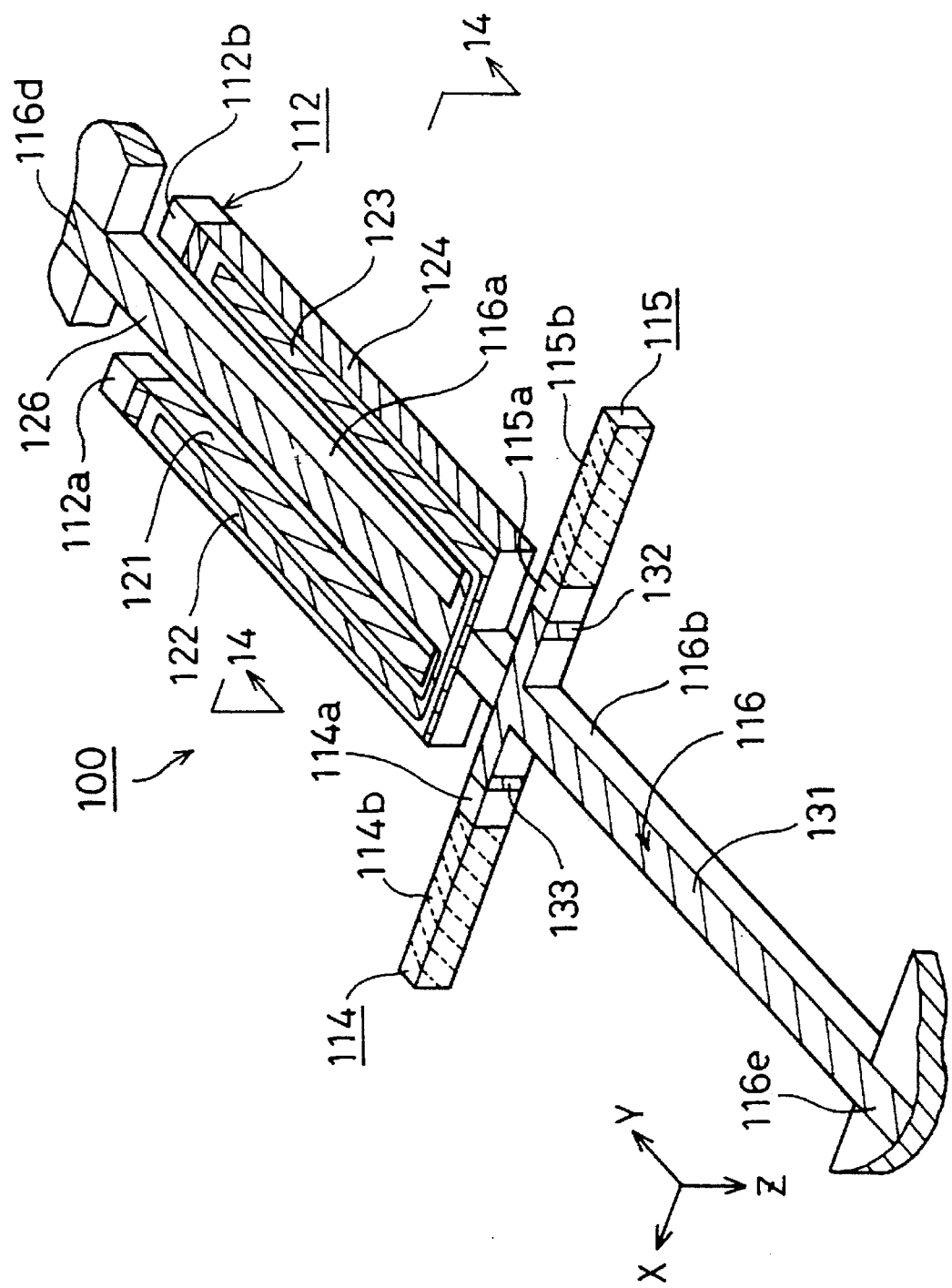
FIG. 13 is a perspective view showing a lower face of the vibration-sensing device 100.

FIG. 12 is a perspective view schematically illustrating an upper face of a vibration-sensing device 100 as a third embodiment according to the invention, and FIG. 13 is a perspective view showing a lower face of the vibration-sensing device 100. The vibration-sensing device 100 of the third embodiment has different appearance and constituents from those of the vibration-sensing device 10 of the first embodiment, as clearly seen in FIGS. 12 and 13. Like the vibration-sensing device 10, the vibration-sensing device 100 includes a tuning fork-shaped vibrating member 112 consisting of a first vibrating tine 112a and a second vibrating tine 112b to have plane vibration, and a torsion bar 116 having both ends fixed to an external frame. The first tuning fork-shaped vibrating member 112 is joined at its base with the torsion bar 116 to form a torsion vibrating system. The vibration-sensing device 100 is also provided with first and second torsion vibrating bars 114 and 115, having different shapes from those of the first and second torsion vibrating members 14 and 15 of the vibration-sensing device 10. The first and second torsion vibrating bars 114 and 115 are projected in opposite directions from the torsion bar 116 to be added to the torsion vibrating system.

Whereas the vibration-sensing device 10 is made of aluminum alloy, the vibration-sensing device 100 of the third embodiment is made of single crystals of quartz having excellent mechanical properties as vibrating material. The first tuning fork-shaped vibrating member 112, the torsion bar 116, and the first and second torsion vibrating bars 114 and 115 of the vibration-sensing device 100 are integrally formed from a crystal plate or crystal wafer processed by known photolithography. In the vibration-sensing device 100 composed of the crystal wafer, the properties of crystal ensure efficient and stable plane vibration of the first and second vibrating tines 112a and 112b of the first tuning fork-shaped vibrating member 112 and torsion vibration of the first and second torsion vibrating bars 114 and 115 in the torsion vibrating system.

The crystal wafer used to constitute the vibration-sensing device 100 has a Z-cut plane revolving two to three degrees round the X axis from a plane perpendicular to the Z axis of crystal. The first tuning fork-shaped vibrating member 112 and the other constituents are integrally formed from the crystal wafer by etching the Z-cut plane on the crystal wafer. On the etched crystal wafer, the longitudinal direction of the first and second vibrating tines 112a and 112b of the first tuning fork-shaped vibrating member 112 and the torsion bar 116 is identical with the Y axis of crystal.

Since crystal itself is a piezoelectric material, electrodes arranged on the surface of crystal work to drive vibrations by the reverse piezoelectric effect and detect vibrations by the piezoelectric effect. In the third embodiment, vapor-deposition laminated films of gold or nickel-chromium alloy are formed as vibration-driving electrodes and torsion vibration-detecting electrodes at appropriate sites described below by photolithography or masking vapor deposition.

Figure 14:
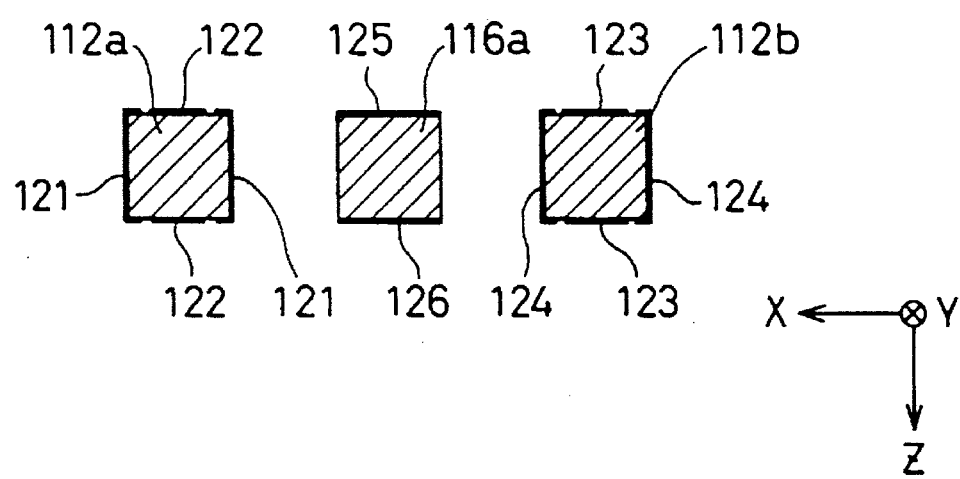
FIG. 14 is an enlarged cross sectional view, taken on the line 14—14 of FIG. 13.

Vibration-driving electrodes for driving plane vibration of the vibrating tines 112a and 112b in the direction of X axis are formed along the longitudinal direction of the first and second vibrating tines 112a and 112b of the first tuning fork-shaped vibrating member 112. With reference to FIGS. 12 and 13 and the enlarged cross sectional view of FIG. 14 taken on the line 14—14 of FIG. 13, a pair of negative electrodes 122 are formed on top and bottom faces of the first vibrating tine 112a, while a pair of positive electrodes 121 are on side faces thereof. In the same manner, a pair of positive electrodes 123 are formed on the second vibrating tine 112b, while a pair of negative electrodes 124 are on side faces thereof. Since the longitudinal direction of each vibrating tine of the first tuning fork-shaped vibrating member 112 is identical with the Y axis of crystal, the configuration of electrodes is defined by the entry in the first row and the second column among the piezoelectric constants of crystal given by the matrix of Equation 1.

Two wiring electrodes 125 and 126 are formed on top and bottom faces of an upper torsion bar element 116a of the torsion bar 116. In the drawings of FIGS. 12 and 13, these electrodes 121 through 126 are shown as hatched portions, where each continuously formed electrode is filled with identical hatches.

The pair of positive electrodes 121 disposed on the first vibrating tine 112a are connected with each other at the free end of the vibrating tine 112a and at the joint with the torsion bar 116. The pair of negative electrode 124 disposed on the second vibrating tine 112b are similarly connected with each other. The positive electrodes 121 and 123 extend to a fixed end 116d of the upper torsion bar element 116a via the upper wiring electrode 125, while the negative electrodes 122 and 124 extend to the fixed end 116d via the lower wiring electrode 126. These electrodes 121 through 124 are further connected to an external drive circuit (not shown) having the same functions as the drive circuit 40 of the first embodiment.

Torsion vibration-detecting electrodes are formed on the first and second torsion vibrating bodies 114 and 115 to detect distortion of the torsion vibrating bodies 114 and 115 accompanied with torsion vibration of the torsion vibrating bodies 114 and 115 round the Y axis. When torsion vibration causes distortion of the torsion vibrating bodies 114 and 115 as shown in FIG. 12, bending stress is generated on these torsion vibrating bodies 114 and 115. The bending stress is observed between the joint of each torsion vibrating body 114 or 115 with the torsion bar 116 and the free end of each torsion vibrating body 114 or 115. The bending stress gives a potential difference between the joint and the free end of each torsion vibrating body by means of the piezoelectric effect of crystal. The torsion vibration-detecting electrodes formed on the first and second torsion vibrating bodies 114 and 115 are utilized to detect such potential difference. Referring to FIG. 12, torsion vibration-detecting electrodes 127 and 128 are formed on the upper faces of the torsion vibrating bodies 114 and 115 to be apart from the joint with the torsion bar 116. Another torsion vibration-detecting electrode 129 is formed on the upper face of the torsion bar 116 at the joint with the torsion vibrating bodies 114 and 115. Two wiring electrodes 130 and 131 are formed on top and bottom faces of a lower torsion bar element 116b of the torsion bar 116. In the drawings of FIGS. 12 and 13, these electrodes 127 through 131 are shown as hatched portions, where each continuously formed electrode is filled with identical hatches.

The torsion vibration-detecting electrodes 127 and 128 disposed on the first and second torsion vibrating bodies 114 and 115 are connected to the lower wiring electrode 131 on the lower torsion bar element 116b via wiring electrodes 132 and 133 formed on side faces of the respective torsion vibrating bodies 114 and 115. The torsion vibration-detecting electrode 129 disposed on the torsion bar 116 is connected to the upper wiring electrode 130 on the lower torsion bar element 116b. These electrodes 127 through 129 extend to a fixed end 116e of the lower torsion bar element 116b via the wiring electrodes 130 and 131 and are further connected to an external detection circuit (not shown) having the same functions as the detection circuit 50 of the first embodiment.

When alternating voltages of a predetermined frequency are applied from the drive circuit to the positive electrodes 121 and 123 and the negative electrodes 122 and 124, the reverse piezoelectric effect of crystal causes plane vibration of the first and second vibrating tines 112a and 112b of the first tuning fork-shaped vibrating member 112. The plane vibration is ascribed to the configuration of electrodes, which is defined by the piezoelectric constant in the first row and the second column in the matrix of Equation 1. When an angular velocity acts to generate Coriolis forces under such conditions, outputs corresponding to torsion vibration are read via the detection circuit from the torsion vibration-detecting electrodes 127 through 129 disposed on the torsion vibrating bodies 114 and 115 by means of the piezoelectric effect of crystal. The piezoelectric constant effective for reading the outputs is the entry in the first row and the first column in the matrix of Equation 1.

In the vibration-sensing device 100, metal films are formed over predetermined ranges on respective ends of the first and second torsion vibrating bodies 114 and 115 by vapor deposition or metal plating. In the embodiment, thin films of gold formed on the torsion vibrating bodies 114 and 115 have a thickness of 0.1 through 10 micrometer. The metal films are shown by the dotted hatches in the drawings of FIGS. 12 and 13. In the vibration-sensing device 100, portions of the increased mass by metal films are arranged to be apart from the torsion bar 116 and used as vibration-adjusting elements 114b and 115b. The mass of the torsion vibrating bodies 114 and 115 can be decreased by partly removing metal films formed on the vibration-adjusting elements 114b and 115b by laser trimming and increased by partly attaching metal films by vapor deposition or the like. Such mass control is applied to adjust the resonance frequency of torsion vibration, like the first embodiment. This method varies the resonance frequency of torsion vibration from 50 to 5,000 Hz and sets a predetermined relationship between the resonance frequency of plane vibration of the first tuning fork-shaped vibrating member 112 and the resonance frequency of torsion vibration of the torsion vibrating bodies 114 and 115. This structure gives a sensor having highly sensitive and stable outputs.

As described above, the mass of the vibration-adjusting elements 114b and 115b is controlled by laser trimming or vapor deposition. For an identical amount of metal, such as gold, trimmed or vapor-deposited, change in the trimmed or vapor-deposited position shifts the center of gravity, thereby varying the adjustment range of the resonance frequency of torsion vibration. Controlling the amount of trimming or vapor deposition and changing the position of trimming or vapor deposition allow the resonance frequency of torsion vibration to be adjusted over a wide range with high precision. Vacuum deposition controls the position and amount of vapor deposition without effect of damping by the presence of gas, that is, under the condition substantially close to the actual working environment of the sensor. The amount of vapor deposition to increase the mass is easily controlled by changing the thickness or area of deposited film, thus realizing the high precision of adjustment.

Figure 15:
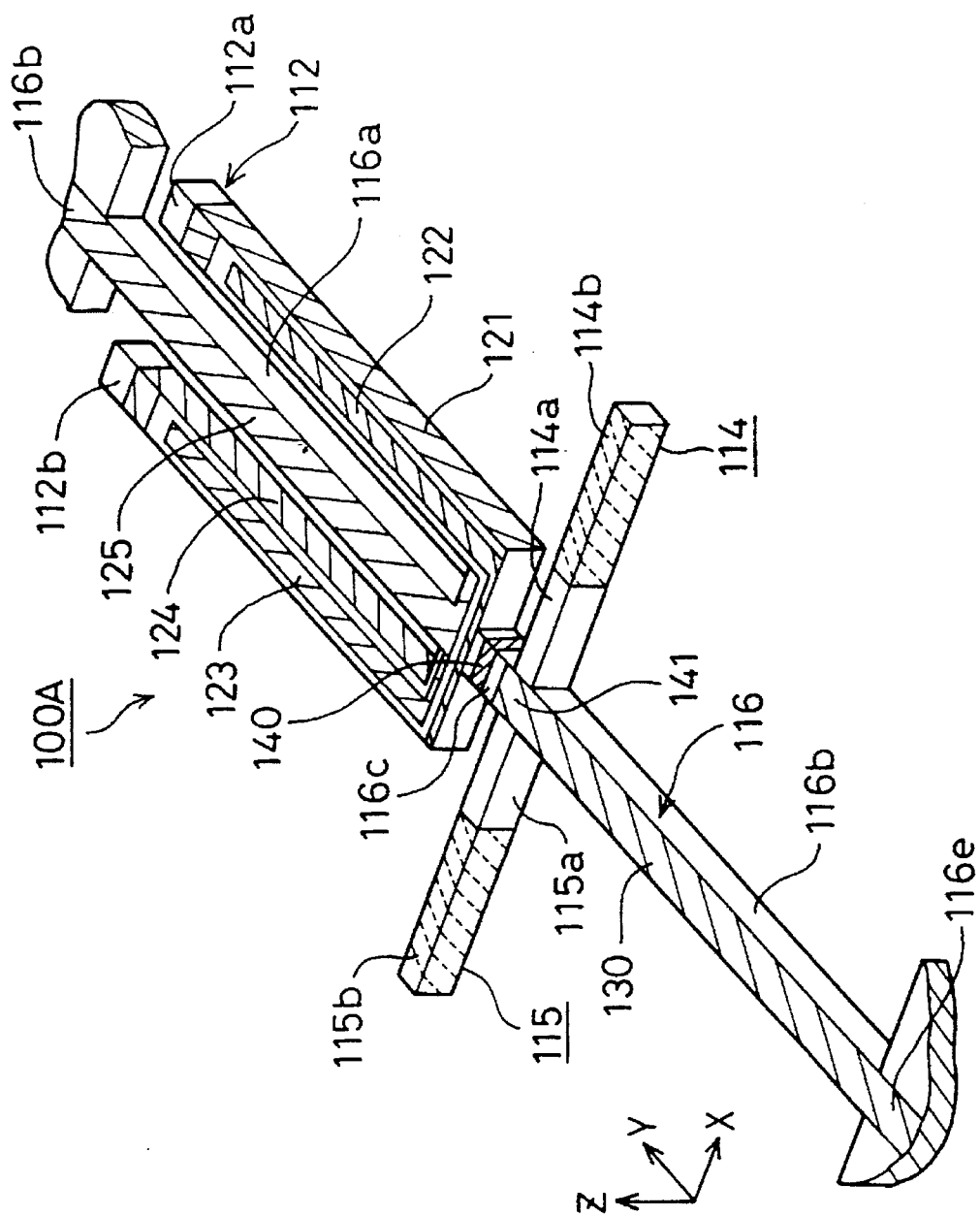
FIG. 15 is a perspective view schematically illustrating an upper face of a vibration-sensing device 100A as a fourth embodiment according to the invention.
Figure 16:
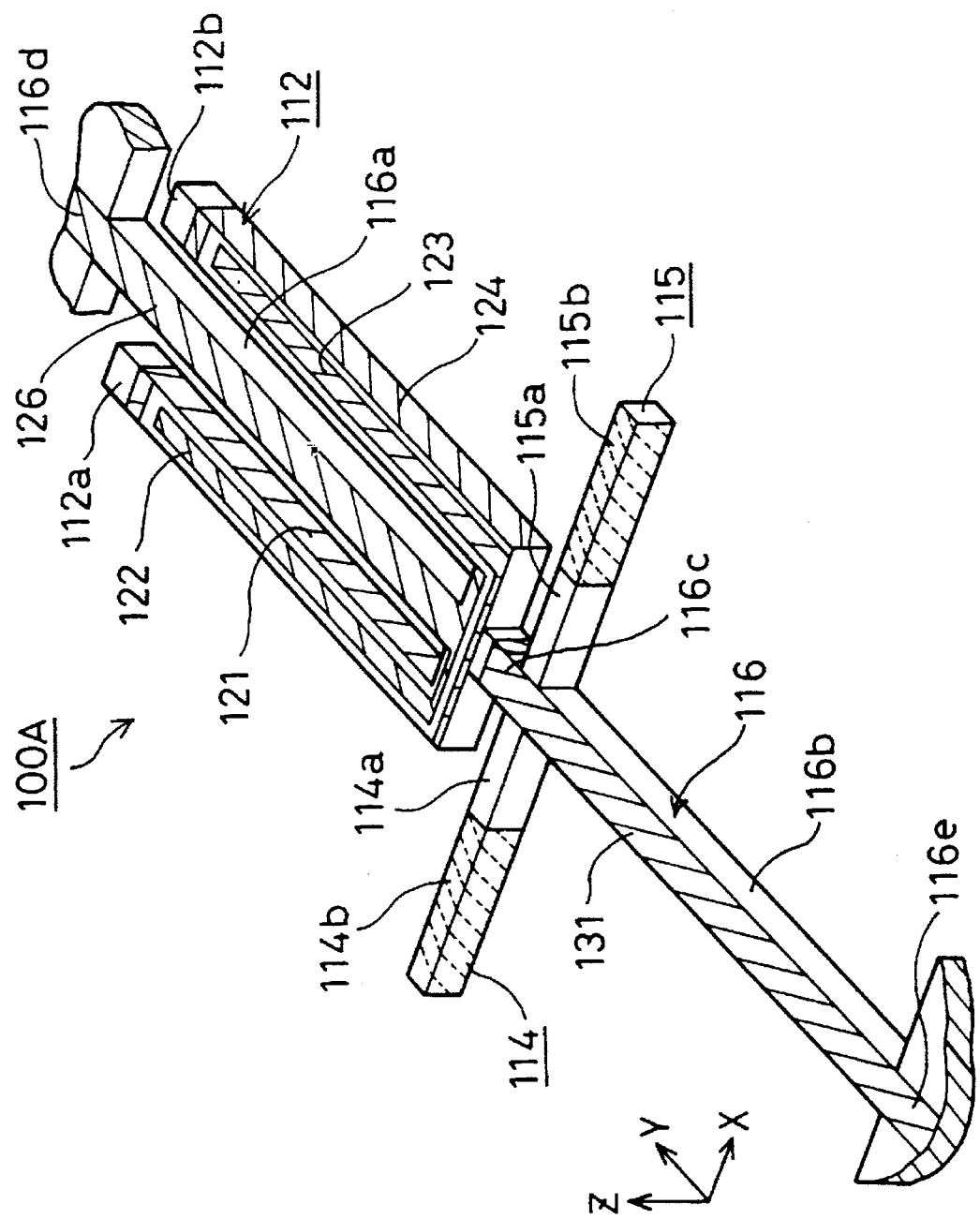
FIG. 16 is a perspective view showing a lower face of the vibration-sensing device 100A.

FIG. 15 is a perspective view schematically illustrating an upper face of still another vibration-sensing device 100A as a fourth embodiment according to the invention, and FIG. 16 is a perspective view showing a lower face of the vibration-sensing device 100A. The vibration-sensing device 100A of the fourth embodiment has substantially the same appearance and constituents including the first tuning fork-shaped vibrating member 112 as those of the vibration-sensing device 100 of the third embodiment. In the fourth embodiment, the longitudinal direction of the respective vibrating tines 112a and 112b of the first tuning fork-shaped vibrating member 112 and the torsion bar 116 is also identical with the Y axis of crystal. The vibration-sensing device 100A, however, has different patterns of torsion vibration-detecting electrodes disposed at different positions.

In the vibration-sensing device 100A of the fourth embodiment, a first torsion vibration-detecting electrode 140 is formed in the vicinity of the joint with the first tuning fork-shaped vibrating member 112 on a central torsion bar element 116c of the torsion bar 116 disposed between the first tuning fork-shaped vibrating member 112 and the torsion vibrating bodies 114 and 115, while a second torsion vibration-detecting electrode 141 is formed in the vicinity of the joint with the first and second torsion vibrating bodies 114 and 115. The torsion vibration-detecting electrodes 140 and 141 work to detect a shearing stress generated by torsion vibration on the upper face of the torsion bar 116.

Because of the following reason, the shearing stress of the torsion bar 116 can be detected by the torsion vibration-detecting electrodes 140 and 141 formed on the torsion bar 116.

In the vibration-sensing device disclosed in the U.S. Pat. No. 4,538,461, shearing stress is detected on its pivot. Since the longitudinal direction of the pivot is identical with the X axis of crystal, the piezoelectric constant used for detecting the shearing stress in this prior art vibration-sensing device is the entry in the second row and the fourth column in the matrix of Equation 1. In the vibration-sensing device 100A of the fourth embodiment, on the other hand, the longitudinal direction of the torsion bar 116 is identical with the Y axis of crystal, and the piezoelectric constant used for the detection of shearing stress on the torsion bar 116 is the entry in the second row and the fifth column in the matrix of Equation 1. The piezoelectric constant in the second row and the fifth column is not equal to zero and accordingly allows the shearing force to be detected with high efficiency.

As shown in FIGS. 15 and 16, the first torsion vibration-detecting electrode 140 is connected to the lower wiring electrode 131 formed on the bottom face of the lower torsion bar element 116b, whereas the second torsion vibration-detecting electrode 141 is connected to the upper wiring electrode 130 formed on the top face of the lower torsion bar element 116b. In the drawings of FIG. 15 and 16, these electrodes 130, 131, 140, and 141 are shown as hatched portions, where each continuously formed electrode is filled with identical hatches. The first and second torsion vibration-detecting electrodes 140 and 141 are used in the following manner to detect torsion vibration of the torsion vibrating system consisting of the first tuning fork-shaped vibrating member 112, the torsion bar 116, and the first and second torsion vibrating bodies 114 and 115.

When an angular velocity acts on the vibration-sensing device 100A to cause torsion vibration in the torsion vibrating system, the torsion vibration is amplified by the first tuning fork-shaped vibrating member 112 and the first and second torsion vibrating bodies 114 and 115. The direction of torsion vibration of the torsion vibrating bodies 114 and 115 is opposite to that of torsion vibration of the first tuning fork-shaped vibrating member 112 as described previously. A significant torsion due to the torsion vibrations of opposed directions causes a distortion and generates a shearing stress on the central torsion bar element 116c of the torsion bar 116, which the torsion vibrating bodies 114 and 115 and the first tuning fork-shaped vibrating member 112 are joined with. The shearing force on the central torsion bar element 116c gives a potential difference between the joint with the first tuning fork-shaped vibrating member 112 and the joint with the torsion vibrating bodies 114 and 115 by means of the piezoelectric effect of crystal. The potential difference depends on the magnitude of shearing force. The torsion vibration-detecting electrodes 140 and 141 detect such potential difference.

Voltages detected by the torsion vibration-detecting electrodes 140 and 141 are taken as outputs corresponding to the angular velocity via the wiring electrodes 130 and 131 formed on the lower torsion bar element 116b and a detection circuit (not shown).

In the vibration-sensing device 100A of the fourth embodiment, shearing stress on the torsion bar 116 generated by the torsion vibration due to application of the angular velocity is detected as the potential difference and taken as an output corresponding to the angular velocity. The structure of the vibration-sensing device 100A of the fourth embodiment improves the detection sensitivity without effect of bending stress by the external disturbance, such as acceleration.

Unlike the vibration-sensing device 100 of the third embodiment, the vibration-sensing device 100A of the fourth embodiment does not have any detecting electrodes on the first and second torsion vibrating bodies 114 and 115. The vibration-adjusting elements 114b and 115b of metal films can thus be formed substantially over the whole surface of the respective torsion vibrating bodies 114 and 115. This allows a greater variation in mass of the vibration-adjusting elements 114b and 115b in the process of adjusting the resonance frequency of torsion vibration. In the vibration-sensing device 100A of the fourth embodiment, large areas of metal films are removed from the tips of the vibration-adjusting elements 114b and 115b by laser trimming for rough adjustment of the resonance frequency, whereas small areas of metal films in the vicinity of the joint with the torsion bar 116 are removed for fine adjustment. This method increases the resonance frequency of torsion vibration over a wide range with high precision, and thereby sets a predetermined relationship between the resonance frequency of plane vibration and the resonance frequency of torsion vibration.

The mass of the vibration-adjusting elements 114b and 115b is increased by vapor deposition to lower the resonance frequency. The degree of adjustment is easily controlled by changing the area and thickness of deposited film and the position of vapor deposition. Large areas at the tips of the vibration-adjusting elements 114b and 115b are coated with metal films by vapor deposition for rough adjustment of the resonance frequency, whereas metal films are deposited on small areas in the vicinity of the joint with the torsion bar 116 for fine adjustment. This method easily decreases the resonance frequency of torsion vibration over a wide range with high precision.

Figure 17:
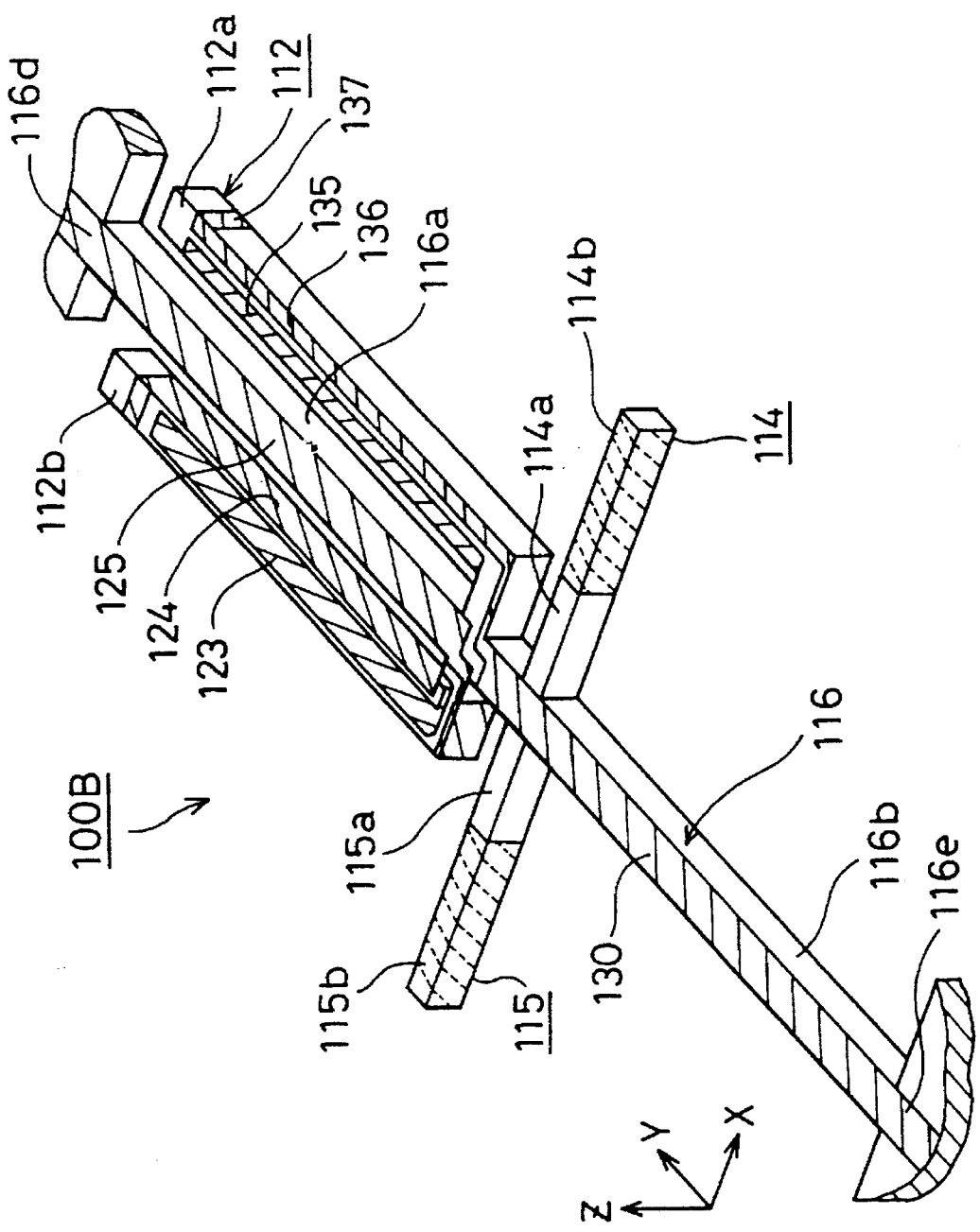
FIG. 17 is a perspective view schematically illustrating an upper face of a vibration-sensing device 100B as a fifth embodiment according to the invention.
Figure 18:
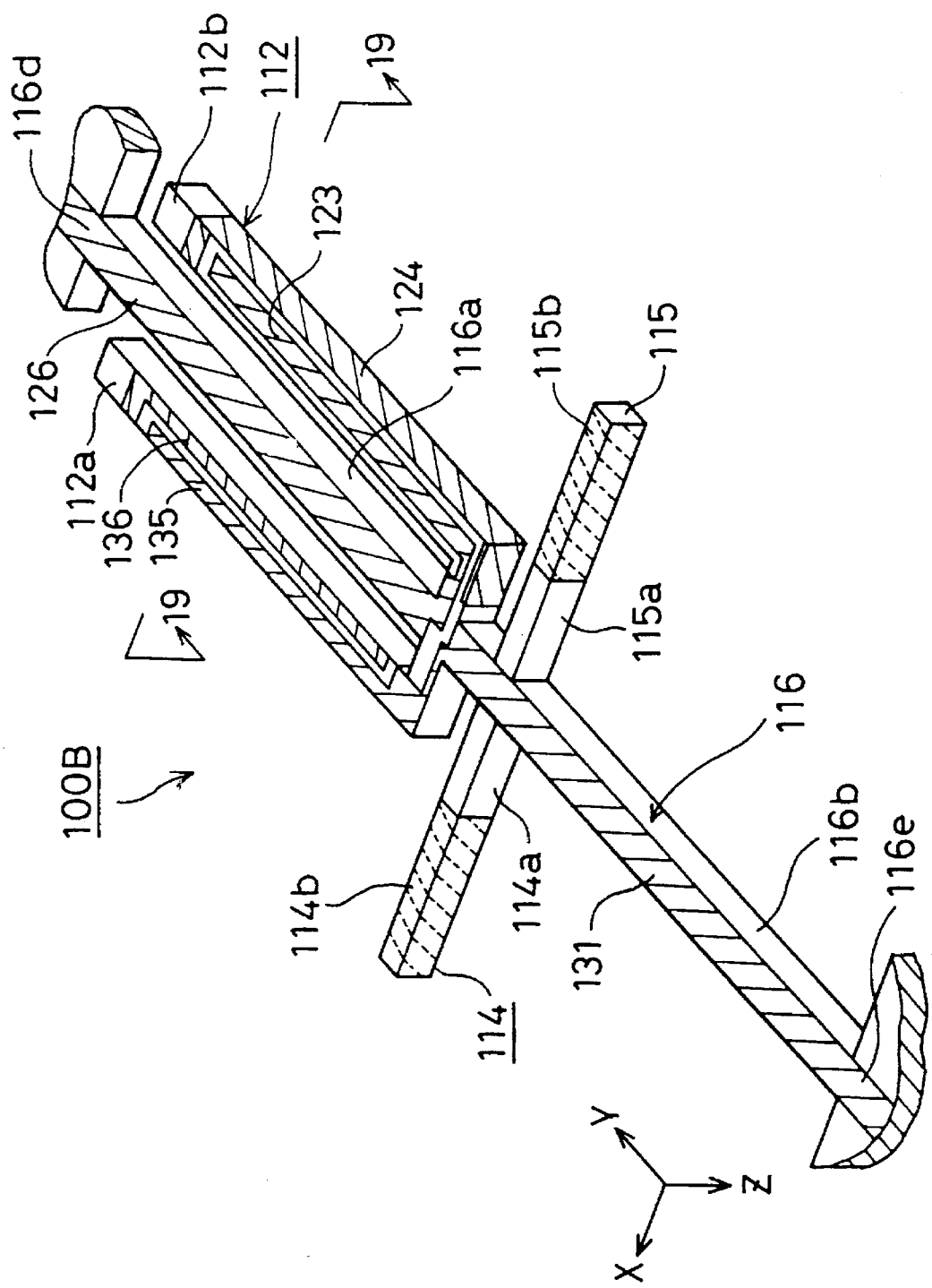
FIG. 18 is a perspective view showing a lower face of the vibration-sensing device 100B.

FIG. 17 is a perspective view schematically illustrating an upper face of still another vibration-sensing device 100B as a fifth embodiment according to the invention, and FIG. 18 is a perspective view showing a lower face of the vibration-sensing device 100B. The vibration-sensing device 100B of the fifth embodiment has substantially the same appearance and constituents including the first tuning fork-shaped vibrating member 112 as those of the vibration-sensing devices 100 and 100A of the third and the fourth embodiments. Unlike the vibration-sensing devices 100 and 100A, however, the fifth embodiment detects torsion vibration by only one vibrating tine of the first tuning fork-shaped vibrating member 112. As described below, the vibration-sensing device 100B has different shapes of torsion vibration-detecting electrodes disposed at different positions from those of the vibration-sensing devices 100 and 100A.

In the vibration-sensing device 100B of the fifth embodiment, the positive electrodes 123 and the negative electrodes 124 identical with those of the vibration-sensing device 100A are arranged only on the second vibrating tine 112b of the first tuning fork-shaped vibrating member 112 to be used as vibration-driving electrodes. The positive electrodes 123 and the negative electrodes 124 receive alternating voltages of a predetermined frequency output from a drive circuit (not shown) via the wiring electrodes 125 and 126 disposed on the top and bottom faces of the upper torsion bar element 116a. The application of alternating voltages drives plane vibration of the second vibrating tine 112b by the reverse piezoelectric effect of crystal. As shown in FIGS. 17 and 18 and the enlarged cross sectional view of FIG. 19 taken on the line 19—19 of FIG. 18, in the vibration-sensing device 100B, torsion vibration-detecting electrodes are arranged on the top and bottom faces of the first vibrating tine 112a of the first tuning fork-shaped vibrating member 112 to extend along the longitudinal direction of the vibrating tine 112a.

The torsion vibration-detecting electrodes include positive electrodes 135 and negative electrodes 136 disposed in parallel on the top and bottom faces of the first vibrating tine 112a. The position of the positive electrode 135 and the negative electrode 136 on the top face is reverse to the same on the bottom face. The positive electrodes 135 are connected to the wiring electrode 131 formed on the bottom face of the lower torsion bar element 116b (see FIG. 18), whereas the negative electrodes 136 are led by a wiring electrode 137 formed on the side face of the first vibrating tine 112a (see FIG. 17) and further connected to the wiring electrode 130 formed on the top face of the lower torsion bar element 116b.

In the drawings of FIG. 17 and 18, these electrodes are shown as hatched portions, where each continuously formed electrode is filled with identical hatches. The torsion vibration-detecting electrodes consisting of the positive electrodes 135 and the negative electrodes 136 detect torsion vibration in the torsion vibrating system, which includes the first tuning fork-shaped vibrating member 112, the torsion bar 116, and the first and second torsion vibrating bodies 114 and 115.

When an angular velocity acts on the vibration-sensing device 100B to cause torsion vibration in the torsion vibrating system, the torsion vibration subsequently generates a bending stress in the direction of Z axis on the first and second vibrating tines 112a and 112b of the first tuning fork-shaped vibrating member 112. The bending stress of the first vibrating tine 112a due to the torsion vibration gives a potential difference having a magnitude corresponding to the bending stress, over the width on the surface of the first vibrating tine 112a by means of the piezoelectric effect of crystal. The torsion vibration-detecting electrodes consisting of the positive electrodes 135 and the negative electrodes 136 formed on the top and bottom faces of the first vibrating tine 112a are used to detect such potential difference.

Voltages detected by the torsion vibration-detecting electrodes are taken as outputs corresponding to the angular velocity via the lower wiring electrode 131 formed on the lower torsion bar element 116b and a detection circuit (not shown).

The vibration-sensing device 100B of the fifth embodiment does not have any detecting electrodes on the torsion vibrating bodies 114 and 115. Like the vibration-sensing device 100A of the fourth embodiment, the structure of the fifth embodiment controls the resonance frequency of torsion vibration over a wide range with high precision, and thereby sets a predetermined relationship between the resonance frequency of plane vibration and the resonance frequency of torsion vibration.

Figure 19:
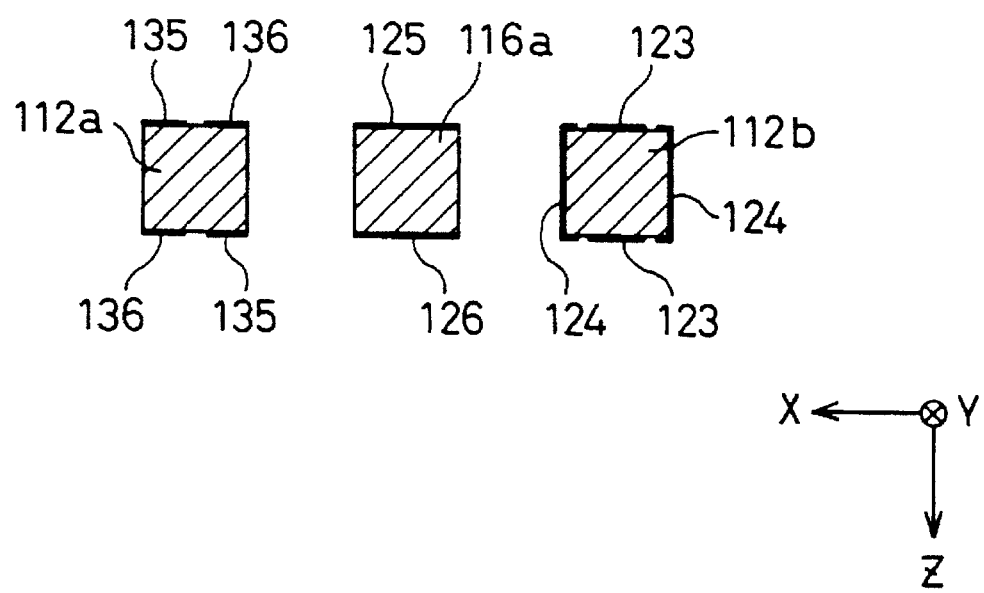
FIG. 19 is an enlarged cross sectional view, taken on the line 19—19 of FIG. 18.

Fixation of the vibration-sensing device of each embodiment is described, using for an example the vibration-sensing device 100B shown in FIGS. 17 through 19.

Figure 20:
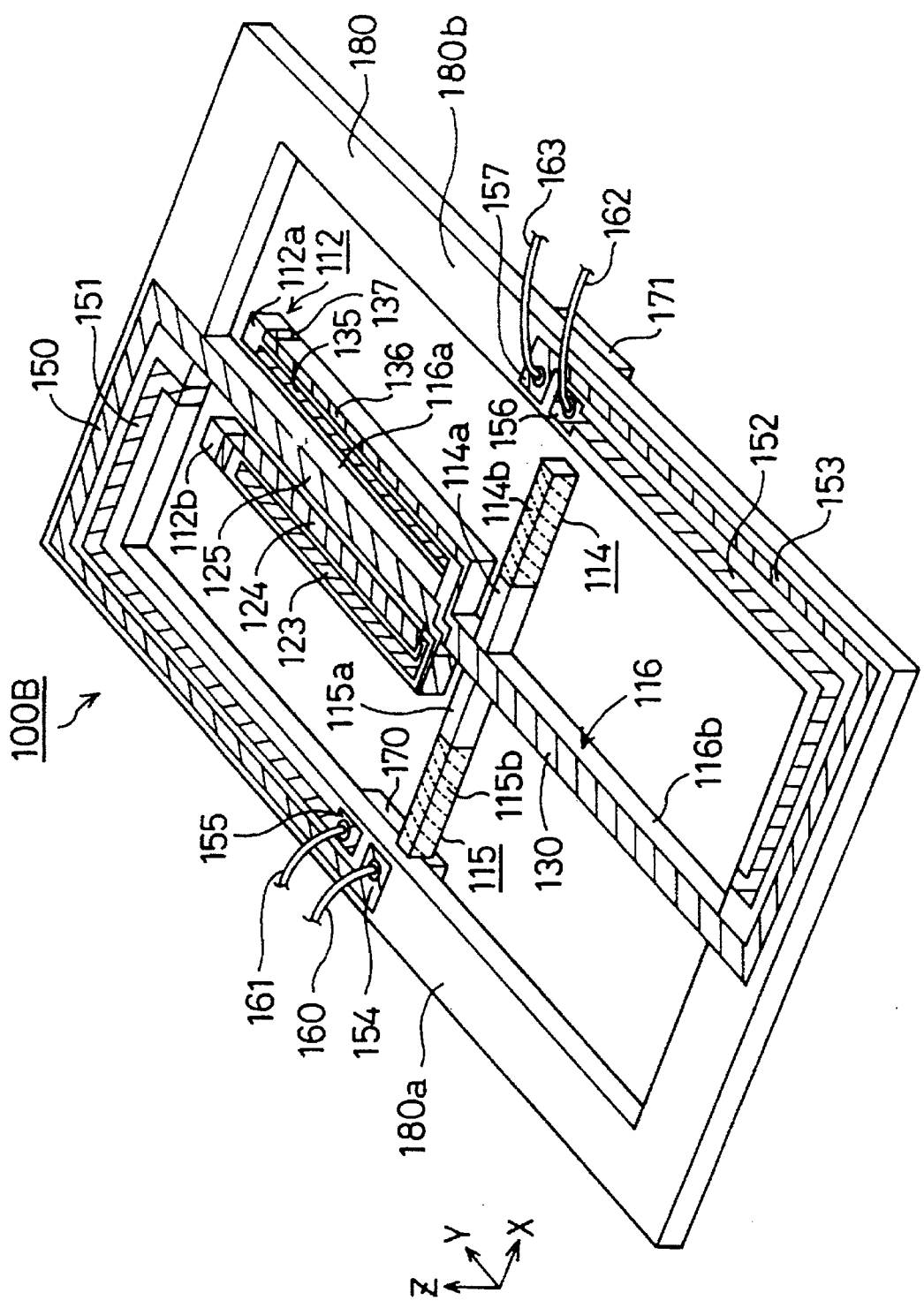
FIG. 20 is a perspective view illustrating the vibration-sensing device 100B of the fifth embodiment fixed to a frame.

Referring to the perspective view of FIG. 20, the vibration-sensing device 100B is fixed to a frame 180 via both the fixed ends 116d and 116e of the torsion bar 116. The frame 180 is a rectangular frame member surrounding the vibration-sensing device 100B and integrally formed with the vibration-sensing device 100B from the same material (single crystals of quartz). In this embodiment, the vibration-sensing device 100B and the frame 180 are integrally formed from a crystal wafer by known photolithography.

On-frame wiring electrodes 150, 151, 152, and 153 formed on a top face of the frame 180 are connected to the wiring electrodes 125, 126, 130, and 131 formed on the top and the bottom faces of the torsion bar 116. These on-frame wiring electrodes 150 through 153 are made of gold or nickel-chromium alloy like the other wiring electrodes, and are formed as laminated films with the other wiring electrodes by masking vapor deposition of photolithography. As shown in FIG. 20, the on-frame wiring electrodes 150 and 153 are connected on the top face of the frame 180 to the wiring electrodes 125 and 130 formed on the top face of the torsion bar 116, whereas the other on-frame wiring electrodes 151 and 152 extend from the top face to the bottom face of the frame 180 and are connected on the bottom face of the frame 180 to the wiring electrodes 126 and 131 formed on the bottom face of the torsion bar 116 (see FIG. 18).

These on-frame wiring electrodes 150, 151, 152, and 153 are respectively provided with bonding electrodes 154, 155, 156, and 157 disposed on respective centers of first and second longitudinal frame elements 180a and 180b of the frame 180 disposed parallel to the torsion bar 116. The bonding electrodes 154 through 157 of the on-frame wiring electrodes 150 through 153 are connected to casing terminals (not shown) via bonding wires 160, 161, 162, and 163 and further to the signal processing circuit as shown in FIG. 3.

The frame 180 further includes fixation elements 170 and 171 arranged on the respective centers of the two longitudinal frame elements 180a and 180b and is fixed to the casing via these fixation elements 170 and 171. The frame 180 may be fixed to the casing by any known method, like bonding with an adhesive, soldering, eutectic bonding, electrostatic bonding, contact bonding, or mechanical bonding with clamps.

Fixation of the vibration-sensing device 100B to the frame 180 causes vibration or torsion of the frame 180 accompanied with vibrations of the vibration-sensing device 100B, more concretely plane vibration of the first tuning fork-shaped vibrating member 112 and torsion vibration of the torsion vibrating bodies 114 and 115. The respective centers of the longitudinal frame elements 180a and 180b where the frame 180 is fixed to the casing are neutral points of vibrations and torsions, that is, sites where no vibration displacement is observed. The vibration-sensing device 100B and the frame 180 are accordingly fixed and secured to the casing via the fixation elements 170 and 171 at the sites of no vibration displacement. This structure effectively prevents vibrations of the vibration-sensing device 100B from leaking into the casing, thereby improving the Q value and the sensitivity of the vibration-sensing device 100B. The structure of the embodiment also interferes with propagation of external disturbance-based vibrations through the casing and effectively protects the vibration-sensing device 100B from adverse effects, like lowered precision, due to the disturbance-based vibrations.

The frame 180 functioning to relieve the stress interferes with propagation of a stress, caused by the difference between coefficients of thermal expansion of the casing and the constituents of the vibration-sensing device 100B, to the vibration-sensing device 100B. This structure effectively prevents a variation in frequency by the thermal stress and stably maintains vibrations of the vibration-sensing device 100B over a wide temperature range.

The bonding electrodes 154 through 157 bonded to the bonding wires 161 through 163 are disposed above the fixation elements 170 and 171 to reinforce the bonding. This structure allows easy and secure bonding with the bonding wires 161 through 163.

Fixation of the vibration-sensing device 100B to the frame 180 securely holds and stabilizes the vibration-sensing device 100B and protects the vibration-sensing device 100B from damages. The fixation also realizes easy handling and enhances the yield of manufacturing vibration-sensing devices.

There may be many modifications, alterations, and changes without departing from the scope or spirit of essential characteristics of the invention. It is thus clearly understood that the above embodiments are only illustrative and not restrictive in any sense. Some examples of modification are given below.

Figure 21:
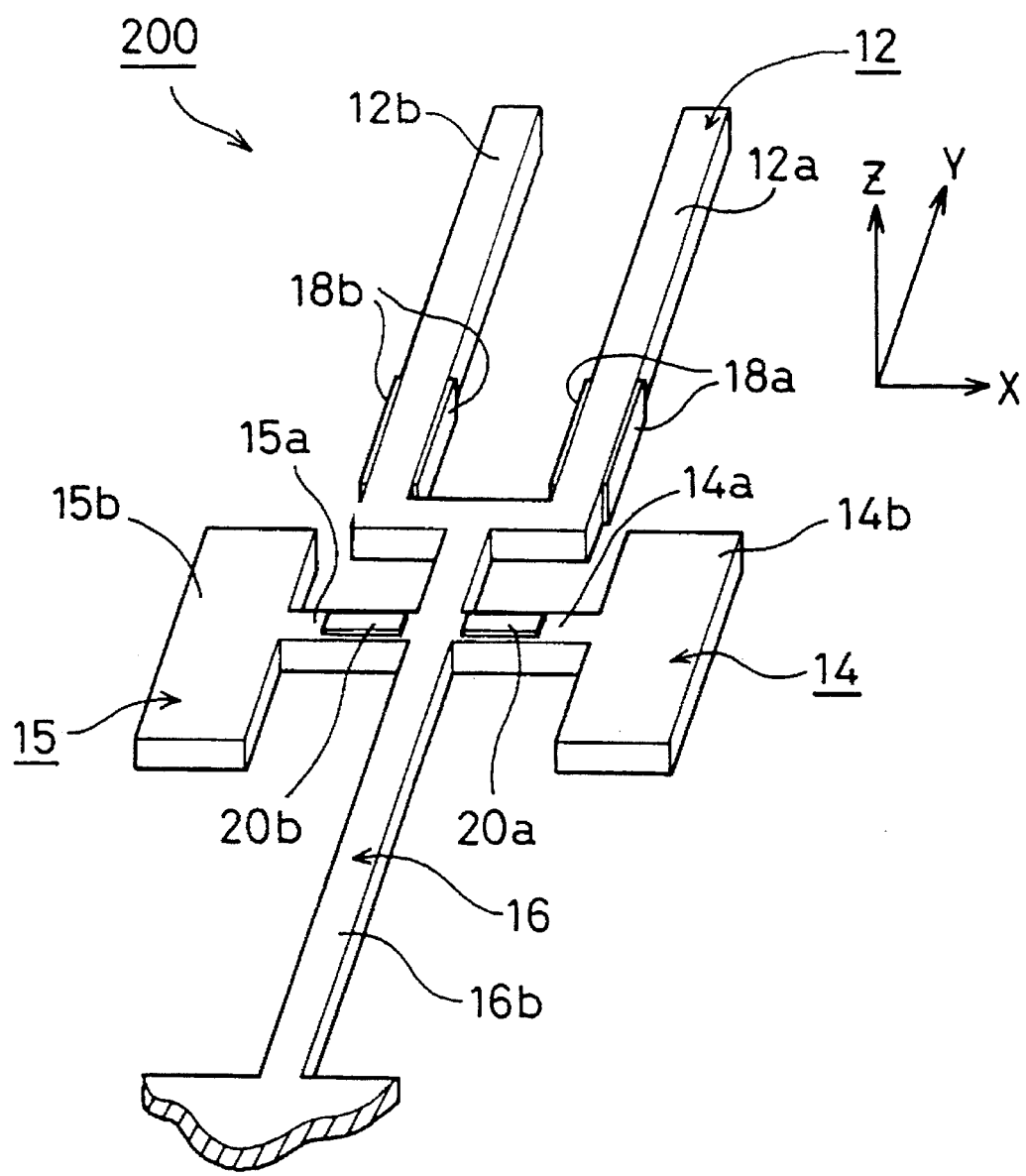
FIG. 21 is a perspective view schematically illustrating a vibration-sensing device 200 as a modification of the vibration-sensing device 10 of the first embodiment.

The torsion bar 16 is fixed on its both ends in the vibration-sensing device 10 of the first embodiment as shown in FIG. 1. In a cantilever vibration-sensing device 200 shown in FIG. 21, however, the torsion bar 16 does not have the upper torsion bar element 16a and is fixed to the frame only via the lower torsion bar element 16b. The vibration-sensing device 200 of modified example has simpler structure and less number of fixation points, thus reducing the time and cost required for the manufacture.

In the vibration-sensing device 10A of the second embodiment, the torsion vibration-detecting piezoelectric elements 20a and 20b are disposed on the top and bottom faces at the root of the first and second vibrating tines 12a and 12b of the first tuning fork-shaped vibrating member 12. The torsion vibration-detecting piezoelectric elements 20a and 20b may, however, be attached to top and bottom faces of first and second base elements 12 m of the first tuning fork-shaped vibrating member 12 across the torsion bar 16 as shown in FIG. 10. Like the vibration-sensing device 10A of the second embodiment, this modified structure simplifies the bonding and wiring process of piezoelectric elements, thus reducing the time and cost required for the manufacture.

The vibration-sensing device 100 of the third embodiment has the vibration-adjusting elements 114b and 115b on the torsion vibrating bodies 114 and 115 for the purpose of mass control. According to another application, the vibration-sensing device does not have the vibration-adjusting elements 114b and 115b. In this structure, mass control is implemented by directly etching tips or other appropriate sites of the torsion vibrating bodies 114 and 115 according to photolithography or the like.

Figure 22:
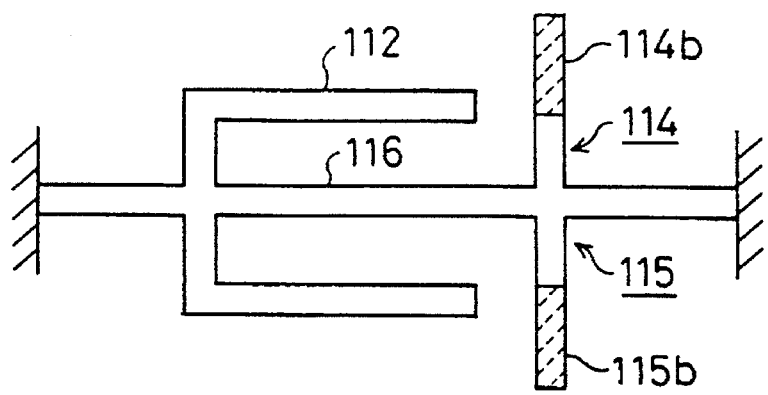
FIG. 22 schematically shows a modification of the vibration-sensing device.

The vibration-sensing devices of the third through the fifth embodiments may be modified to have different appearance. For example, the first tuning fork-shaped vibrating member 112 is joined with the torsion bar 116 in such an orientation that the free ends of the first tuning fork-shaped vibrating member 112 face to the torsion vibrating bodies 114 and 115 as shown in FIG. 22. This modification increases the length of torsion bar element between the joint with the first tuning fork-shaped vibrating member 112 and the joint with the torsion vibrating bodies 114 and 115, thereby lowering the frequency of torsion vibration. The frequency of plane vibration of the first tuning fork-shaped vibrating member 112 falls with the decrease in frequency of torsion vibration. This gives a vibration-sensing device vibrating at lower frequencies. In the modified structure of FIG. 22, the vibration-adjusting elements 114b and 115b of the torsion vibrating bodies 114 and 115 are filled with dotted hatches.

Figure 23:
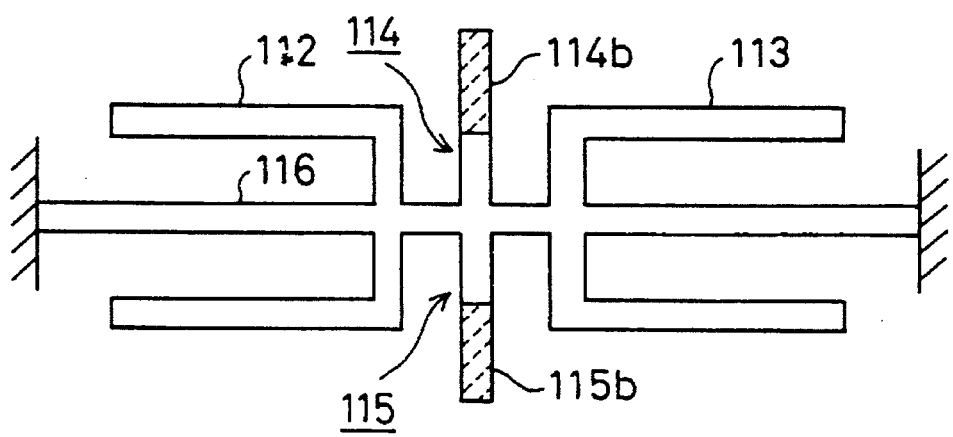
FIG. 23 schematically shows another modification of the vibration-sensing device.
Figure 24:
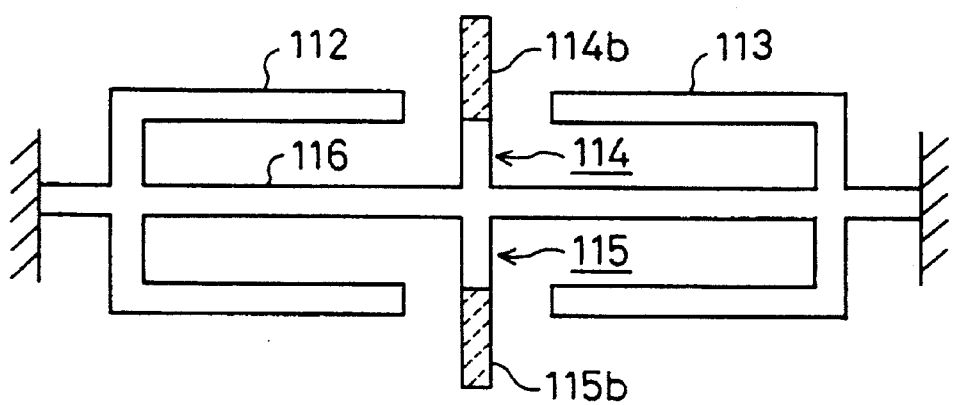
FIG. 24 schematically shows still another modification of the vibration-sensing device.

According to another application, the second tuning fork-shaped vibrating member 113 is further disposed, as well as the first tuning fork-shaped vibrating member 112, so as to face each other across the torsion vibrating bodies 114 and 115 as shown in FIGS. 23 and 24. The two tuning fork-shaped vibrating members 112 and 113 in the torsion vibrating system heighten the vibrational energy of plane vibration and enhances the magnitude of torsion vibration corresponding to the angular velocity, thus improving the sensitivity of the sensor. In the modified structures of FIGS. 23 and 24, the vibration-adjusting elements 114b and 115b of the torsion vibrating bodies 114 and 115 are filled with dotted hatches.

Figure 25:
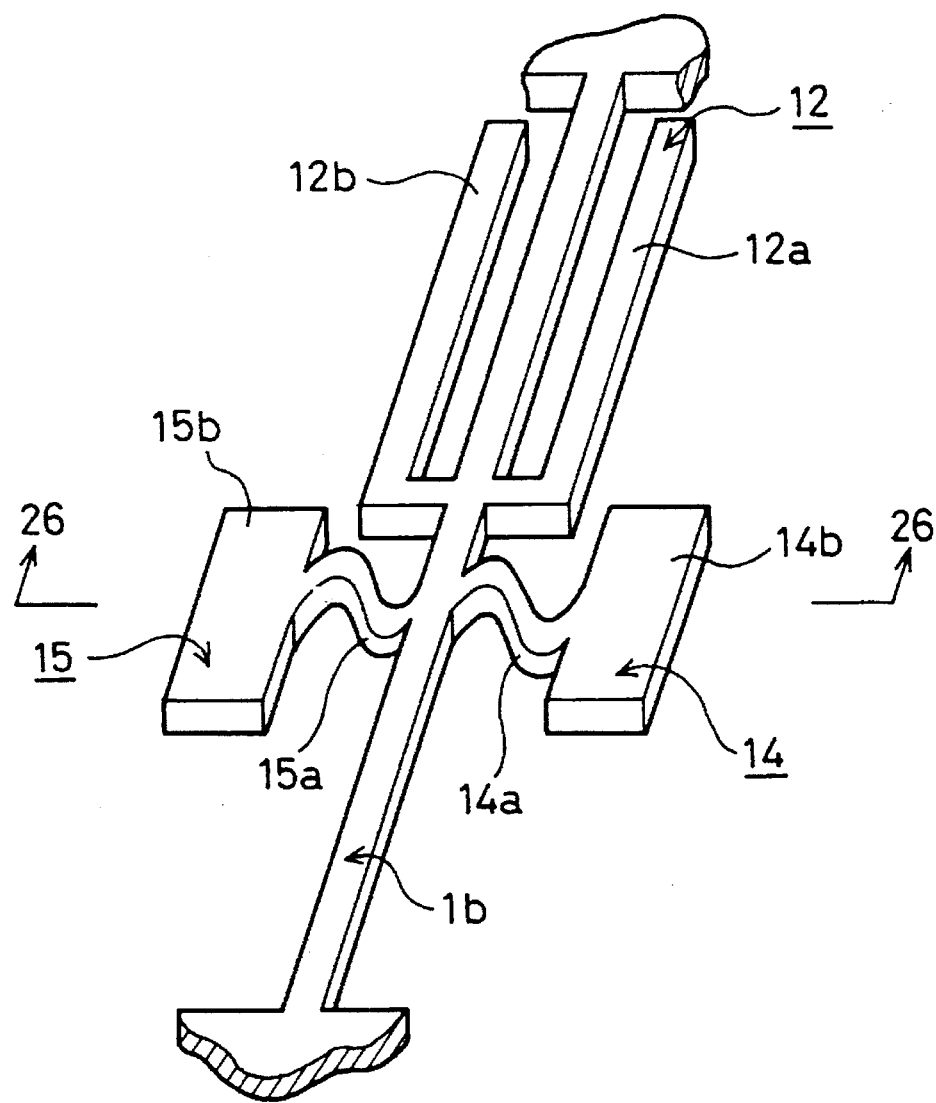
FIG. 25 is a perspective view schematically illustrating another vibration-sensing device having torsion vibrating beams 14a and 15a of modified structure.
Figure 26:
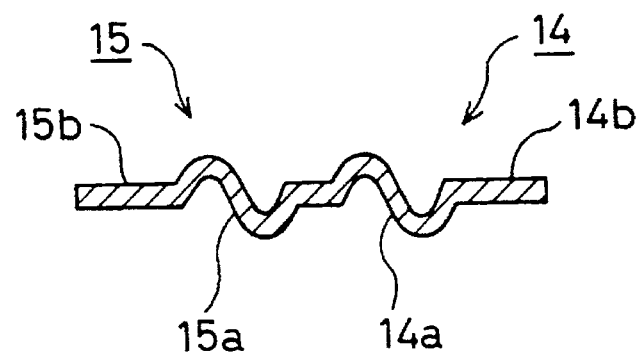
FIG. 26 is an enlarged cross sectional view, taken on the line 26—26 of FIG. 25.

In the vibration-sensing device 10 of the first embodiment, the torsion bar 16 of rectangular cross section is joined with the first tuning fork-shaped vibrating member 12 and the torsion vibrating bodies 14 and 15 to form a torsion vibrating system causing torsion vibration corresponding to the angular velocity. According to one modification, the torsion bar 16 or the torsion vibrating beams 14a and 15a of the torsion vibrating bodies 14 and 15 may have a torsion spring-like structure easily driving torsion vibration; for example, curved, spiral, or looped structure. FIG. 25 and the enlarged cross sectional view of FIG. 26 taken on the line 26—26 of FIG. 25 show an example of such modification, where the torsion vibrating beams 14a and 15a are curved spring members arranged symmetrically with respect to the torsion bar 16. This structure allows the smaller spring constant of the torsion bar 16 and shortens the whole length of the torsion bar 16 and the length of the torsion vibrating bodies 14 and 15, thereby reducing the dimensions of the angular velocity sensor.

The torsion bar, the first tuning fork-shaped vibrating member, and the torsion vibrating bodies of the above embodiments may be made of any material which stably maintains vibrations. Examples of applicable material include various metals and alloys like stainless steel, iron-nickel alloys, and identity elastic alloys, dielectrics like crystal and PZT, semiconductors like silicon, powdery sintered bodies, crystals, and ceramics.

Although the reverse piezoelectric effect of PZT is used as the vibration-driving means applied to drive plane vibration of the first tuning fork-shaped vibrating member 12 in the first and second embodiments, other piezoelectric materials like ZnO may be used instead. According to another possible structure, the electrostatic force, magnetic force, or electromagnetic force may be applied to the first tuning fork-shaped vibrating member 12 to drive vibration of the first tuning fork-shaped vibrating member 12. While the piezoelectric effect of PZT is used as the torsion vibration-detecting means applied to detect the angular velocity in the above embodiments, other piezoelectric materials like ZnO may be used for the same purpose. Other possible structure detects the electrostatic force, magnetic force, or electromagnetic force varying with torsion vibration or detects the distortion varying with torsion vibration with a distortion gauge.

In the above embodiments, metal pieces are bonded or removed for the purpose of controlling the mass of the torsion vibrating bodies 14 and 15 in the resonance frequency adjusting process. The mass control may, however, be implemented by bonding or removing metal of low melting point like solder or silver solder or organic bonding material to or from the mass control elements 14b and 15b.

The vibration-sensing devices 100, 100A, and 100B of the third through the fifth embodiments are made of crystal wafers. Other piezoelectric materials are, however, also applicable; for example, piezoelectric ceramics like PZT and PLZT, piezoelectric single crystals or synthetic piezoelectric crystals like ethylenediamine tartrate (EDT), dipotassium tartrate (DKT), aluminum dihydrogenphosphate (ADP), LiTaO$_3$, and LiNbO$_3$.

The structure of the above embodiments drives vibrations of the first tuning fork-shaped vibrating member 12 or 112 in the direction of X axis and detects, as angular velocity signals, torsion vibrations round the Y axis generated by application of the angular velocity round the Y axis. Another possible structure drives torsion vibrations round the Y axis and detects vibrations along the X axis generated by application of the angular velocity round the Y axis. The latter structure can also effectively amplify plane vibration as well as torsion vibration of the torsion vibrating bodies, thus exerting the same effects as the above embodiment, for example, improving the detection sensitivity and simplifying the resonance frequency adjusting process. In this structure, the vibration-driving piezoelectric elements or electrodes working as input terminal of the vibration-sensing device in the above embodiments are connected as output terminals to the detection circuit, whereas the torsion vibration-detecting piezoelectric elements or electrodes working as output terminals in the above embodiments are connected as input terminals to the drive circuit.

In the fifth embodiment described above, the positive electrodes 123 and the negative electrodes 124 functioning as vibration-driving electrodes are attached to the second vibrating tine 112b of the first tuning fork-shaped vibrating member 112, while the positive electrodes 135 and the negative electrodes 136 functioning as torsion vibration-detecting electrodes are attached to the first vibrating tine 112a. According to one modified structure, torsion vibration-detecting electrodes as well as the vibration-driving electrodes may be attached to the second vibrating tine 112b, and vibration-driving electrodes as well as the vibration-detecting electrodes may be attached to the first vibrating tine 112a. In this modified structure, each vibrating tine is provided with both the vibration-driving electrodes and torsion vibration-detecting electrodes, which are arranged in parallel along the longitudinal direction of each vibrating tine. Wiring patterns to the respective electrodes are formed on the surface of each vibrating tine, and the vibration-driving positive and negative electrodes and the torsion vibration-detecting positive and negative electrodes are separately connected to terminals on the casing via the torsion bar 116 and the frame 180, in the same manner as the vibration-sensing device 100B of the fifth embodiment described above.

In the structure having both the vibration-driving electrodes and torsion vibration-detecting electrodes on each vibrating tine, both the first and second vibrating tines 112a and 112b of the first tuning fork-shaped vibrating member 112 have vibration-driving sites and are thus driven to have vibrations of opposed phases. This structure stably and efficiently drives plane vibrations of the vibrating tines 112a and 112b having large amplitude. Both the first and second vibrating tines 112a and 112b of the first tuning fork-shaped vibrating member 112 also have torsion vibration-detecting sites, which output signals representing the state of torsion vibration generated by application of the angular velocity. The structure processes a difference between the output signals to give stable outputs with high sensitivity. Even when an external disturbance, such as acceleration, is applied, the structure having both the vibration-driving electrodes and torsion vibration-detecting electrodes on each vibrating tine compensates the disturbance with the output signals from the two detecting sites, thus accurately extracting output signals only depending upon the angular velocity.

The scope and spirit of the present invention are limited only by the terms of the appended claims.

What is claimed is:

1. A vibration-sensing device comprising:
   a first tuning fork-shaped vibrating member having a base, a first vibrating tine and a second vibrating tine, said first and second vibrating tines being joined with each other at said base to be fork-shaped, said first and second tines vibrating in a plane where said first and second tines exist;
   a vibration-driver fixed to said first tuning fork-shaped vibrating member and configured to drive plane vibration of said first and second vibrating tines of said first tuning fork-shaped vibrating member in said plane;
   a torsion bar including at least a first torsion bar element connected to said base and extending in said plane in a direction opposite to a direction in which said first and second vibrating tines extend;
   a torsion vibrating member including a first beam projected from said first torsion bar element, a second beam projected from said first torsion bar element in a direction opposite to the direction in which said first beam is projected, a first mass control element connected to an end of said first beam, and a second mass control element connected to an end of said second beam;

said torsion bar, said first tuning fork-shaped vibrating member, and said torsion vibrating member forming a torsion vibrating system around an axis of said torsion bar; and a torsion-vibration-detector configured to detect a state of torsion vibration driven in said torsion vibrating system and to output a signal representing said state of torsion vibration.

2. A vibration-sensing device in accordance with claim 1, wherein said first and second beams of said torsion vibrating member and said torsion bar comprise bars of rectangular cross section, respectively.

3. A vibration-sensing device in accordance with claim 1, wherein at least one of said first and second beams of said torsion vibrating member and said torsion bar comprises a torsion spring structure which drives torsion vibration.

4. A vibration-sensing device in accordance with claim 1, wherein said first beam, said second beam, said first mass control element, and said second mass control element of said torsion vibrating member exist in said plane where said first vibrating tine and said second vibrating tine exist.

5. A vibration-sensing device in accordance with claim 4, wherein said first and second mass control elements comprise plate-like bodies respectively disposed on ends of said first and second beams.

6. A vibration-sensing device in accordance with claim 4, wherein said torsion vibrating member, said torsion bar, and said first tuning fork-shaped vibrating member are composed of crystal, and a longitudinal direction of said torsion bar coincides with a direction of Y axis of said crystal.

7. A vibration-sensing device in accordance with claim 4, wherein said torsion vibrating member is projected from said first torsion bar element to face free ends of said first and second vibrating tines of said first tuning fork-shaped vibrating member.

8. A vibration-sensing device in accordance with claim 4, wherein said torsion vibration member has an initial moment of inertia around said axis of said torsion bar of 1–0.1 times a natural moment of inertia of said first tuning fork-shaped vibrating member around said axis of said torsion bar.

9. A vibration-sensing device in accordance with claim 4, wherein said torsion vibrating member has an initial moment of inertia around said axis of said torsion bar of 2–20 times a natural moment of inertia of said first tuning fork-shaped vibrating member around said axis of said torsion bar.

10. A vibration-sensing device in accordance with claim 4, wherein a ratio of a distance between said torsion vibrating member and said base of said first tuning fork-shaped vibrating member to an entire length of said torsion bar is not greater than 0.5.

11. An angular velocity sensor in accordance with claim 4, wherein said vibration-driver comprises:

a first vibrating tine driver configured to drive plane vibration of said first vibrating tine of said first tuning fork-shaped vibrating member;

second vibrating tine detector configured to detect a state of plane vibration of said second vibrating tine of said first tuning fork-shaped vibrating member and to output a signal representing the state of plane vibration; and a vibration adjusting element configured to control said first vibrating tine driver based on said signal output from said second vibrating tine detector, and to cause the plane vibration of said first vibrating tine and the plane vibration of said second vibrating tine to have opposite phases in said plane.

12. An angular velocity sensor in accordance with claim 11, said angular velocity sensor further comprising a calculator configured to calculate an angular velocity based on said signal output from said torsion-vibration-detector.

13. An angular velocity sensor in accordance with claim 4, wherein said torsion-vibration-detector comprises:

a first torsion-vibration-detector fixed to said first and second beams at a first distance from said first torsion bar element.

14. An angular velocity sensor in accordance with claim 13, wherein said first torsion-vibration-detector comprises means for detecting the state of torsion vibration by means of said first and second beams of said torsion vibrating member at a first distance from said first torsion bar element.

15. An angular velocity sensor in accordance with claim 4, wherein said torsion-vibration-detector comprises:

a second torsion-vibration-detector fixed to said first tuning fork-shaped vibrating member.

16. An angular velocity sensor in accordance with claim 4, said angular velocity sensor further comprising a calculator configured to calculate an angular velocity based on said signal output from said torsion-vibration-detector.

17. A vibration-sensing device in accordance with claim 4, wherein said torsion bar further comprises a second torsion bar element connected to said base and extending between said first and second vibrating tines in said plane wherein said first and second vibrating tines exist.

18. A vibration-sensing device in accordance with claim 1, wherein said vibration-driver further comprises:

a first vibration-driving element fixed to said first vibrating tine, and a second vibration-driving element fixed to said second vibrating tine at a same position along said second vibrating tine that said first vibration-driving element is fixed along said first vibrating tine.

19. An angular velocity sensor in accordance with claim 1, wherein said vibration-driver comprises:

a first vibrating tine driver configured to drive plane vibration of said first vibrating tine of said first tuning fork-shaped vibrating member;

a second vibrating tine detector configured to detect a state of plane vibration of said second vibrating tine of said first tuning fork-shaped vibrating member and to output a signal representing the state of plane vibration; and a vibration adjusting element configured to control said first vibrating tine driver based on said signal output from said second vibrating tine detector, and to cause the plane vibration of said first vibrating tine and the plane vibration of said second vibrating tine to have opposite phases in said plane.

20. An angular velocity sensor in accordance with claim 19, further comprises a calculator configured to calculate an angular velocity based on said signal output from said torsion-vibration-detector.

21. An angular velocity sensor in accordance with claim 1, wherein said torsion-vibration-detector comprises:

A first torsion-vibration-detector fixed to said first and second beams of said torsion vibrating member.

22. An angular velocity sensor in accordance with claim 21, wherein said first torsion-vibration-detector comprises a detecting unit configured to detect the state of torsion vibration by means of said first and second beams of said torsion vibrating member at a first distance from said first torsion bar element.

23. An angular velocity sensor in accordance with claim 21, further comprising a calculator configured to calculate an angular velocity based on said signal output from said torsion-vibration-detector.

24. An angular velocity sensor in accordance with claim 1, wherein said torsion-vibration-detector comprises:

a second torsion-vibration-detector fixed to said first tuning fork-shaped vibrating member.

25. An angular velocity sensor in accordance with claim 24, further comprising a calculator configured to calculate an angular velocity based on said signal output from said torsion-vibration-detector.

26. An angular velocity sensor in accordance with claim 1, further comprising a calculator configured to calculate an angular velocity based on said signal output from said torsion-vibration-detector.

27. A method of adjusting a vibration-sensing device comprising a first tuning fork-shaped vibrating member having a base, a first vibrating tine and a second vibrating tine, said first and second vibrating tines being joined with each other at said base to be fork-shaped, said first and second tines vibrating in a plane where said first and second tines exist; a vibration-driver fixed to said first tuning fork-shaped vibrating member and configured to drive plane vibration of said first and second vibrating tines of said first tuning fork-shaped vibrating member in said plane; a torsion bar including at least a first torsion bar element connected to said base and extending in said plane in a direction opposite to the direction in which said first and second vibrating tines extend; a torsion vibrating member including a first beam projected from said first torsion bar element, a second beam projected from said first torsion bar element in a direction opposite to the direction in which said fist beam is projected; a first mass control element connected to an end of said first beam, and a second mass control element connected to an end of said second beam; said torsion bar, said first tuning fork-shaped vibrating member, and said torsion vibrating member forming a torsion vibrating system around an axis of said torsion bar; and a torsion-vibration-detector configured to detect a state of torsion vibration driven in said torsion vibrating system and to output a signals representing said state of torsion vibration, said method comprising:

controlling a mass of said torsion vibrating member by adjusting a mass of at least one of said first and second beams and said first and second mass control elements, thereby setting a predetermined relationship between a resonance frequency of plane vibration of said first tuning fork-shaped vibrating member in said plane and a resonance frequency of torsion vibration of said torsion vibrating member.

28. A method in accordance with claim 27, wherein the method further comprises the step of:

making the resonance frequency of said first tuning fork-shaped vibrating member coincide with the resonance frequency of said torsion vibrating member.

29. A vibration-sensing device comprising:

a first tuning fork-shaped vibrating member having a base, a first vibrating tine and a second vibrating tine, said first and second vibrating tines being joined with each other at said base to be fork-shaped, said first and second tine vibrating in a plane where said first and second tines exist;

a torsion bar including at least a first torsion bar element connected to said base and extending in said plane where said first and second vibrating tines exist in a direction opposite to the direction in which said first and second vibrating tines extend;

a torsion vibrating member including a first beam projected from said first torsion bar element, a second beam projected from said first torsion bar element in a direction opposite to the direction in which said first beam is projected, a first mass control element connected to an end of said first beam, and a second mass control element connected to an end of said second beam;

said torsion bar, said first tuning fork-shaped vibrating member, and said torsion vibrating member forming a torsion vibrating system around an axis of said torsion bar;

a torsion-vibration-driver configured to drive torsion vibration in said torsion vibrating system around said torsion bar; and a plane-vibration-detector configured to detect a state of plane vibration of said first and said second vibrating tines of said first tuning fork-shaped vibrating member in said plane, caused by the torsion vibration driven in said torsion vibrating system, and to output a signal representing the state of plane vibration.

30. A vibration-sensing device in accordance with claim 29, wherein said first beam, said second beam, said first mass control element, and said second mass control element of said torsion vibrating member exist in said plane where said first and second vibrating tines exist.

31. An angular velocity sensor in accordance with claim 30, said angular velocity sensor further comprising a calculator configured to calculate an angular velocity based on said signal output from said plane-vibration-detector.

32. An angular velocity sensor in accordance with claim 29, further comprising a calculator configured to calculate an angular velocity based on said signal output from said plane-vibration-detector.

* * * * *